(12) United States Patent
Lynch

(10) Patent No.: US 10,049,129 B2
(45) Date of Patent: Aug. 14, 2018

(54) METHOD AND APPARATUS FOR PROVIDING MAP UPDATES FROM DISTANCE BASED BUCKET PROCESSING

(71) Applicant: HERE Global B.V., Veldhoven (NL)

(72) Inventor: James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 793 days.

(21) Appl. No.: 14/579,095

(22) Filed: Dec. 22, 2014

(65) Prior Publication Data

US 2016/0179874 A1    Jun. 23, 2016

(51) Int. Cl.
| | |
|---|---|
| *G06F 7/00* | (2006.01) |
| *G06F 17/00* | (2006.01) |
| *G06F 17/30* | (2006.01) |
| *G01C 21/30* | (2006.01) |

(52) U.S. Cl.
CPC ....... *G06F 17/30377* (2013.01); *G01C 21/30* (2013.01); *G06F 17/30241* (2013.01); *G06F 17/30371* (2013.01)

(58) Field of Classification Search
CPC ......... G06F 17/30241; G06F 17/30345; G06F 17/30371; G06F 17/30377
See application file for complete search history.

(56) References Cited

U.S. PATENT DOCUMENTS

| | | | | |
|---|---|---|---|---|
| 2007/0008090 A1* | 1/2007 | Gertsch | .................. | B60P 1/045 340/435 |
| 2009/0024656 A1* | 1/2009 | Wellman | ........... | G06F 17/30241 |
| 2010/0017108 A1* | 1/2010 | Nakamura | ............. | G01C 21/32 701/532 |
| 2010/0047744 A1* | 2/2010 | Miura | .................. | B60W 40/09 434/66 |
| 2010/0082564 A1* | 4/2010 | Fernekes | ........... | G06F 17/30241 707/705 |
| 2012/0078867 A1* | 3/2012 | Dorum | .................. | G01C 21/32 707/705 |
| 2012/0209818 A1* | 8/2012 | Richter | ............. | G06F 17/30371 707/690 |
| 2012/0259547 A1* | 10/2012 | Morlock | ................ | G01C 21/32 701/533 |
| 2012/0303222 A1* | 11/2012 | Cooprider | ............. | B60W 10/06 701/48 |

(Continued)

*Primary Examiner* — Hasanul Mobin
(74) *Attorney, Agent, or Firm* — Dittahavong & Steiner, P.C.

(57) ABSTRACT

An approach is provided for converting voluminous sensor datasets into manageable distance based buckets for slope and curvature map updates. The approach involves causing, at least in part, a map-matching of one or more data sessions with one or more map links, wherein the one or more data sessions represent one or more location data packages associated with a vehicle. The approach also involves causing, at least in part, a division of the one or more map links into one or more buckets at one or more intervals. The approach further involves processing and/or facilitating a processing of the one or more buckets for variance statistics to determine reliability information for acceleration slope values, acceleration curvature values, or a combination thereof calculated from the one or more location data packages. The approach also involves causing, at least in part, an updating of one or more maps based, at least in part, on the reliability information.

17 Claims, 32 Drawing Sheets

(56) References Cited

U.S. PATENT DOCUMENTS

| | | | |
|---|---|---|---|
| 2013/0090823 A1* | 4/2013 | Hoffmann | G01C 21/3461 |
| | | | 701/70 |
| 2013/0249909 A1* | 9/2013 | Thompson | G06T 17/05 |
| | | | 345/420 |
| 2014/0058661 A1* | 2/2014 | Choi | G01C 21/32 |
| | | | 701/428 |
| 2014/0358436 A1* | 12/2014 | Kim | B60W 30/12 |
| | | | 701/532 |

* cited by examiner

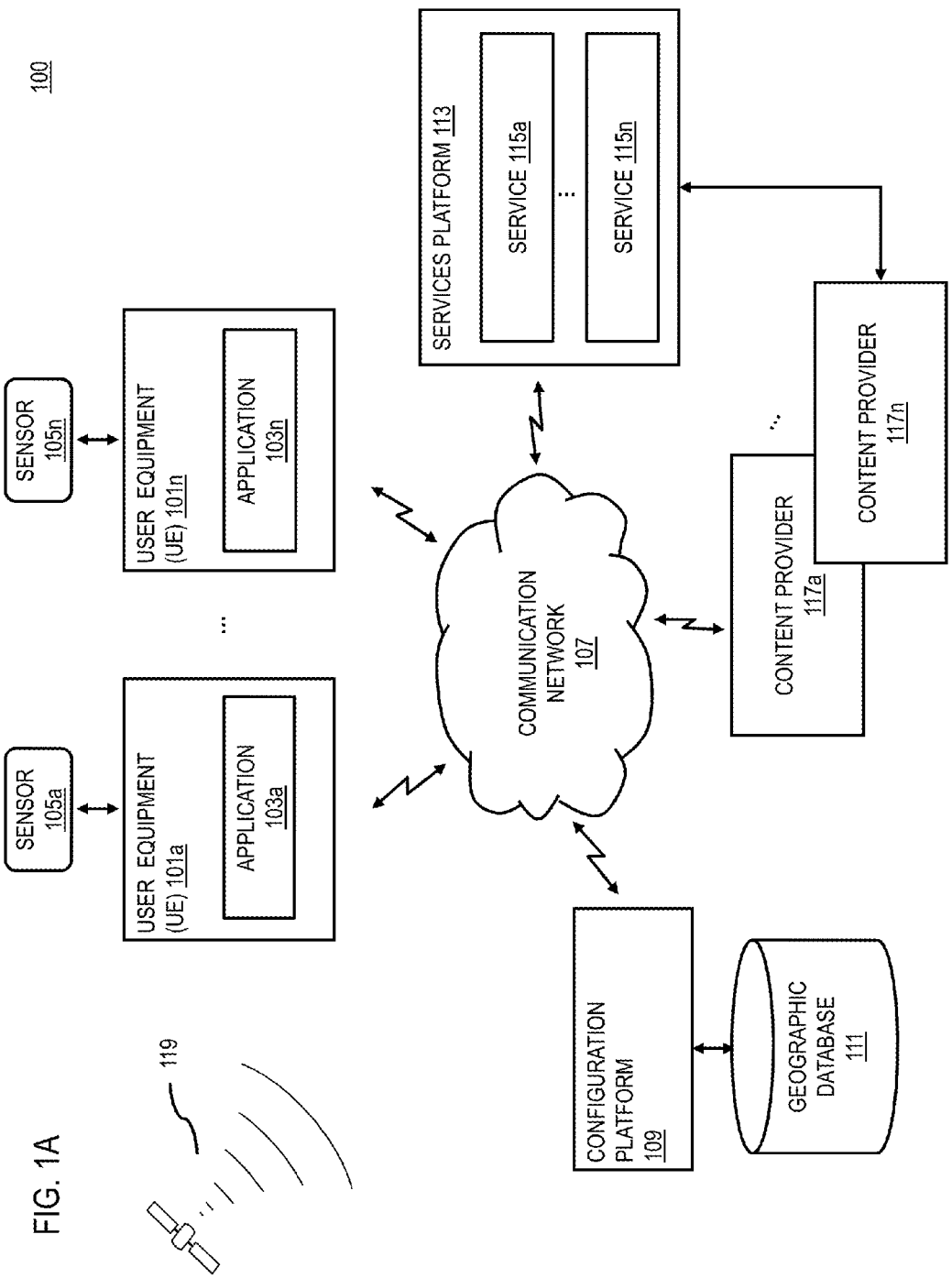

FIG. 11

| # | Time Stamp | Latitude | Longitude | Altitude | Link ID | Parameter/Distance | Status |
|---|---|---|---|---|---|---|---|
| 1 | 33.34 | 11.23254 | -88.32432 | 232.24 | 54353 | 0.0 | Virtual |
| 2 | 34 | 11.23254 | -88.32434 | 232.25 | 54353 | 0.2 | Match |
| 3 | 35 | 11.23253 | -88.32435 | 232.24 | 54353 | 0.3 | Match |
| 4 | 36 | Null | Null | Null | Null | Null | InValid |
| 5 | 37 | 11.23252 | -88.32436 | 232.21 | 54353 | 0.9 | Match |
| 6 | 37.5 | 11.23251 | -88.32438 | 232.24 | 54353 | 1.0 | Virtual |
| 7 | 38 | 11.23250 | -88.32439 | 232.21 | 234123 | 0.07 | Match |

FIG. 22A

| Radius | 24 - 6* LOG(R) |
|---|---|
| 14 | 17.1 |
| 21 | 16.1 |
| 32 | 15.0 |
| 46 | 14.0 |
| 68 | 13.0 |
| 100 | 12.0 |
| 147 | 11.0 |
| 215 | 10.0 |
| 317 | 9.0 |
| 465 | 8.0 |
| 680 | 7.0 |
| 1000 | 6.0 |
| 1465 | 5.0 |
| 2150 | 4.0 |
| 3160 | 3.0 |
| 4650 | 2.0 |
| 6800 | 1.0 |
| 10000 | 0.0 |
| 10000 | 0.0 |
| -6800 | -1.0 |
| 4650 | 2.0 |
| -3160 | -3.0 |
| -2150 | -4.0 |
| -1465 | -5.0 |
| -1000 | -6.0 |
| -680 | -7.0 |
| -465 | -8.0 |
| -317 | -9.0 |
| -215 | -10.0 |
| -147 | -11.0 |
| -100 | -12.0 |
| -68 | -13.0 |
| -46 | -14.0 |
| -32 | -15.0 |
| -21 | -16.1 |
| -14 | -17.1 |

2201

METHOD AND APPARATUS FOR PROVIDING MAP UPDATES FROM DISTANCE BASED BUCKET PROCESSING

BACKGROUND

Service providers and device manufacturers (e.g., wireless, cellular, etc.) are continually challenged to deliver value and convenience to consumers by, for example, providing compelling network services. One area of interest has been implementation of sensors-based services to sense road details, and electronic mapping technologies to provide device users with on demand access to high quality maps based on the sensed road details. However, service providers are continually challenged to deliver value and convenience to consumers by, for example, efficiently combining voluminous and high-frequency sensor datasets (e.g., data collections for road segments, drive sessions etc.) into aggregated and meaningful high-definition map datasets.

SOME EXAMPLE EMBODIMENTS

Therefore, there is a need for an approach for converting voluminous sensor datasets into manageable distance based buckets for slope and curvature map updates.

According to one embodiment, a method comprises causing, at least in part, a map-matching of one or more data sessions with one or more map links, wherein the one or more data sessions represent one or more location data packages associated with a vehicle. The method also comprises causing, at least in part, a division of the one or more map links into one or more buckets at one or more intervals. The method further comprises processing and/or facilitating a processing of the one or more buckets for variance statistics to determine reliability information for acceleration slope values, acceleration curvature values, or a combination thereof calculated from the one or more location data packages. The method also comprises causing, at least in part, an updating of one or more maps based, at least in part, on the reliability information.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a map-matching of one or more data sessions with one or more map links, wherein the one or more data sessions represent one or more location data packages associated with a vehicle. The apparatus is also caused to cause, at least in part, a division of the one or more map links into one or more buckets at one or more intervals. The apparatus is further caused to process and/or facilitate a processing of the one or more buckets for variance statistics to determine reliability information for acceleration slope values, acceleration curvature values, or a combination thereof calculated from the one or more location data packages. The apparatus is also caused to cause, at least in part, an updating of one or more maps based, at least in part, on the reliability information.

According to another embodiment, a computer-readable storage medium carries one or more sequences of one or more instructions which, when executed by one or more processors, cause, at least in part, an apparatus to cause, at least in part, a map-matching of one or more data sessions with one or more map links, wherein the one or more data sessions represent one or more location data packages associated with a vehicle. The apparatus is also caused to cause, at least in part, a division of the one or more map links into one or more buckets at one or more intervals. The apparatus is further caused to process and/or facilitate a processing of the one or more buckets for variance statistics to determine reliability information for acceleration slope values, acceleration curvature values, or a combination thereof calculated from the one or more location data packages. The apparatus is also caused to cause, at least in part, an updating of one or more maps based, at least in part, on the reliability information.

According to another embodiment, an apparatus comprises means for causing, at least in part, a map-matching of one or more data sessions with one or more map links, wherein the one or more data sessions represent one or more location data packages associated with a vehicle. The apparatus also comprises means for causing, at least in part, a division of the one or more map links into one or more buckets at one or more intervals. The apparatus further comprises means for processing and/or facilitating a processing of the one or more buckets for variance statistics to determine reliability information for acceleration slope values, acceleration curvature values, or a combination thereof calculated from the one or more location data packages. The apparatus also comprises means for causing, at least in part, an updating of one or more maps based, at least in part, on the reliability information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of converting voluminous sensor datasets into manageable distance based buckets for slope and curvature map updates, according to one embodiment;

FIG. 11 is a diagram that represents a match result list, according to one example embodiment;

FIGS. 22A-C are graph diagrams that represents the radius/curvature transform method, according to one example embodiment;

DESCRIPTION OF SOME EMBODIMENTS

Figure 1B:
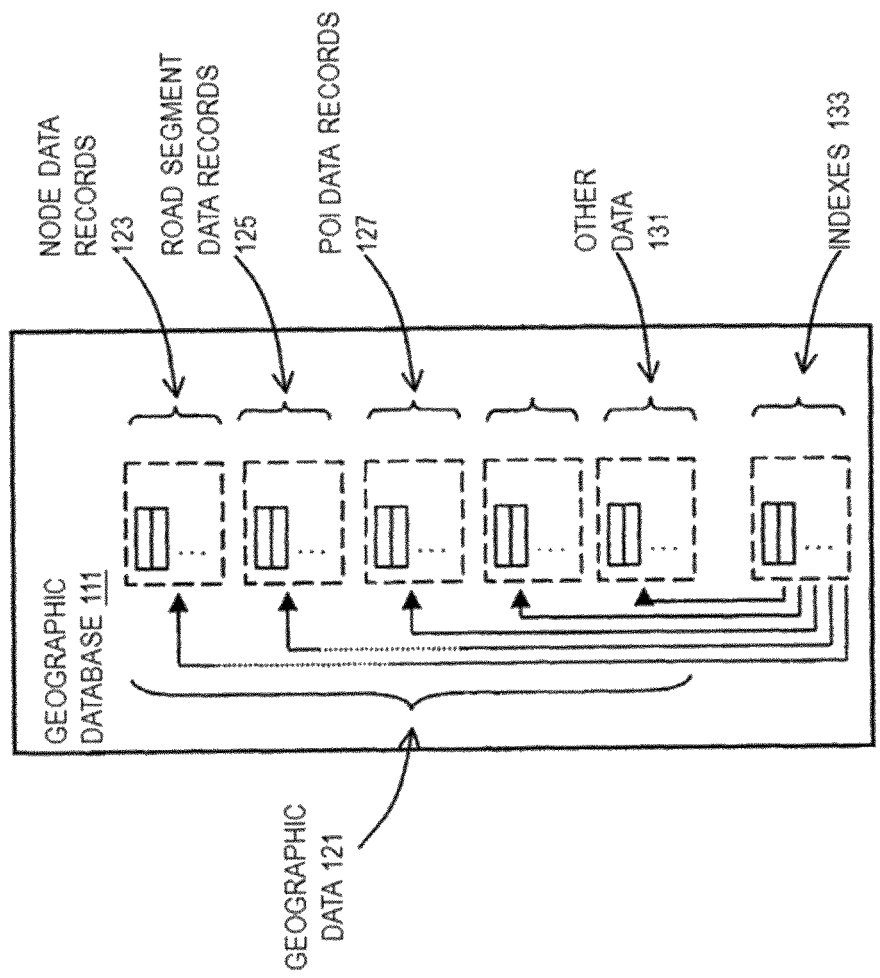
FIG. 1B is a diagram of the geographic database 111 of system 100, according to exemplary embodiments.

Examples of a method, apparatus, and computer program for converting voluminous sensor datasets into manageable distance based buckets for slope and curvature map updates are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system capable of converting voluminous sensor datasets into manageable distance based buckets for slope and curvature map updates, according to one embodiment. At present, the processing systems cannot handle multiple drive sessions over the same road segment (e.g., ADAS slope processing). The system is targeted towards low frequency, low quality, high-volume probe data, typically as points only. However, the autonomous datasets are advanced sensor data (not just location points) which are high-frequency (e.g., 50 Hz), high quality, and high volume. As a result, there is a requirement for a scalable process that may handle millions of drive sessions.

To address this problem, a system 100 of FIG. 1A introduces the capability of map learning from highly detailed, crowd sourced vehicle sensor data. These datasets are different from historical probe data points (e.g., probe data is typically a set of low quality geo-location points). Generally, position information, velocity information and a fairly low frequency were available, this limited the feasibility of using this type of data for advanced analysis, for example, curvature, slope, speed signs, acceleration, bank, road geometry, elevation, etc. At present, autonomous vehicles are providing large scale, high-quality sensor data that is targeted toward autonomous driving. The advanced sensors serve two main purposes: 1) sensing current road details for real-time autonomous driving, and 2) learning road details to create high-quality, predictive maps for enabling future autonomous driving. However, the challenge is in efficiently combining the large volume, high-frequency autonomous datasets into aggregated, meaningful high-definition map data sets. Since there is accessibility to thousands of data collections for each road segment, system 100 may reduce the processing into manageable segments. In one scenario, the hundreds of gigabytes and hundreds of thousands of drive sessions are divided into road link groups. These road link groups are further divided into distance based buckets along each of these links (e.g., a difference bucket every 5 meters). The system 100 may aggregate all data into discrete buckets so that each bucket may be processed independently. After a solution is reached for each bucket, system 100 may have a manageable set of data. The individual bucket results are then strung back together into strands of buckets with knowledge of their neighbors so that higher level processing may be achieved.

As shown in FIG. 1A, the system 100 comprises user equipment (UE) 101*a*-101*n* (collectively referred to as UE 101) that may include or be associated with applications 103*a*-103*n* (collectively referred to as applications 103) and sensors 105*a*-105*n* (collectively referred to as sensors 105). In one embodiment, the UE 101 has connectivity to a configuration platform 109 via the communication network 107. In one embodiment, the configuration platform 109 performs one or more functions associated with converting voluminous sensor datasets into manageable distance based buckets for slope and curvature map updates.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

By way of example, the applications 103 may be any type of application that is executable at the UE 101, such as mapping application, location-based service applications, navigation applications, content provisioning services, camera/imaging application, media player applications, social networking applications, calendar applications, and the like. In one embodiment, one of the applications 103 at the UE 101 may act as a client for the configuration platform 109 and perform one or more functions associated with the functions of the configuration platform 109 by interacting with the configuration platform 109 over the communication network 107.

By way of example, the sensors 105 may be any type of sensor. In certain embodiments, the sensors 105 may include, for example, a global positioning sensor for gathering location data (e.g., GPS may provide information on the difference between the past and the current position for at least one vehicle), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, velocity sensors mounted on steering wheels of the vehicles, and the like. In another embodiment, the sensors 105 may include light sensors, oriental sensors augmented with height sensor and acceleration sensor (e.g., an accelerometer can measure acceleration and can be used to determine orientation of the UE 101), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors 105 may detect weather data, traffic information, or a combination thereof. In one example embodiment, the UE 101 may include GPS receivers to obtain geographic coordinates from satellites 119 for determining current location and time associated with the UE 101. Further, the location can be determined by a triangulation system such as A-GPS, Cell of Origin, or other location extrapolation technologies. In another example embodiment, the one or more sensors may provide in-vehicle navigation services, wherein one or more location based services may be provided to the at least one vehicle and/or at least one UE 101 associated with the at least one vehicle.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the configuration platform 109 may be a platform with multiple interconnected components. The configuration platform 109 may include multiple servers, intelligent networking devices, computing devices, components and corresponding software for converting voluminous sensor datasets into manageable distance based buckets for slope and curvature map updates. In addition, it is noted that the configuration platform 109 may be a separate entity of the system 100, a part of the one or more services 115a-115n (collectively referred to as services 115) of the services platform 113, or included within the UE 101 (e.g., as part of the applications 103).

In one embodiment, the configuration platform 109 may cause, at least in part, a map-matching of one or more data sessions with one or more map links, wherein the one or more data sessions represent one or more location data packages associated with a vehicle. In one scenario, the configuration platform 109 implements a process to convert bulk probe sensor data into slope and curvature map updates. The configuration platform 109 assembles one or more sensor data and then processes the sensor data into usable slope and curvature that is then provided as updates to the original maps. In another embodiment, the configuration platform 109 may cause, at least in part, a division of the one or more map links into one or more buckets at one or more intervals. In a further embodiment, the configuration platform 109 may process and/or facilitate a processing of the one or more buckets for variance statistics to determine reliability information for acceleration slope values, acceleration curvature values, or a combination thereof calculated from the one or more location data packages. In another embodiment, the configuration platform 109 may cause, at least in part, an updating of one or more maps based, at least in part, on the reliability information.

In one embodiment, the geographic database 111 may store attributes (e.g., velocity information, dimension information, etc.) for one or more travel segments. The information may be any multiple types of information that can provide means for aiding in the content provisioning and sharing process.

The services platform 113 may include any type of service. By way of example, the services platform 113 may include mapping services, navigation services, travel planning services, notification services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the configuration platform 109 and the content provider 117 to supplement or aid in the processing of the content information.

By way of example, the services 115 may be an online service that reflects interests and/or activities of users. The services 115 allow users to share location information (e.g., speed information), activities information (e.g., travel plans), contextual information, historical user information and interests within their individual networks, and provides for data portability. The services 115 may additionally assist in providing the configuration platform 109 with information on travel plans of at least one user, activity information for at least one user in at least one location, speed information for at least one user, user profile information, and a variety of additional information.

The content providers 117a-117n (collectively referred to as content provider 117) may provide content to the UE 101, the configuration platform 109, and the services 115 of the services platform 113. The content provided may be any type of content, such as, image content (e.g., maps), textual content, audio content, video content, etc. In one embodiment, the content provider 117 may provide content that may supplement content of the applications 103, the sensors 105, or a combination thereof. By way of example, the content provider 117 may provide content that may aid in presenting comprehensible representation of slope and curvature maps. In one embodiment, the content provider 117 may also store content associated with the UE 101, the configuration platform 109, and the services 115 of the services platform 113. In another embodiment, the content provider 117 may manage access to a central repository of data, and offer a consistent, standard interface to data, such as, a repository of attributes for one or more slopes, one or more curvature, or a combination thereof. Any known or still developing methods, techniques or processes for presenting comprehensible representation of slope and curvature maps may be employed by the configuration platform 109.

By way of example, the UE 101, the configuration platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city).

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., designated parking areas). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the UE 101 to provide an end user with navigation features. In such a case, the geographic database 111 can be downloaded or stored on the UE 101, such as in the applications 103, or the UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions, for example, slope and curvature map updates.

Figure 2:
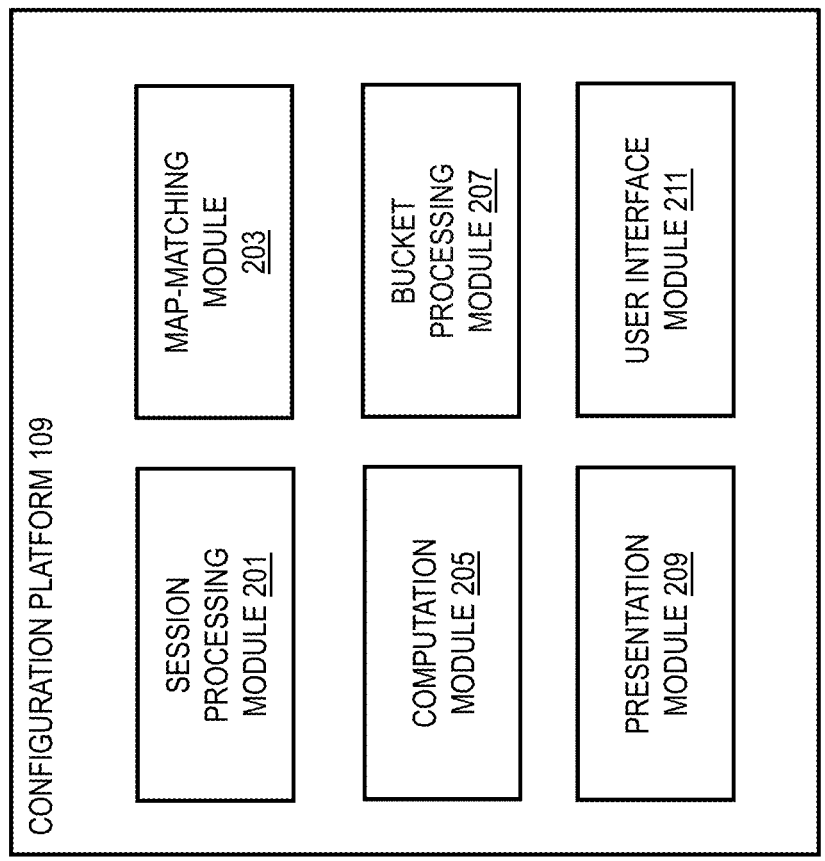
FIG. 2 is a diagram of the components of the configuration platform 109, according to one embodiment.

FIG. 2 is a diagram of the components of the configuration platform 109, according to one embodiment. By way of example, the configuration platform 109 includes one or more components for converting voluminous sensor datasets into manageable distance based buckets for slope and curvature map updates. It is contemplated that the functions of these components may be combined in one or more components or performed by other components of equivalent functionality. In this embodiment, the configuration platform 109 includes a session processing module 201, a map-matching module 203, a computation module 205, a bucket processing module 207, a presentation module 209, and a user interface module 211.

In one embodiment, the session processing module 201 may process the packages of data types to determine the one or more sessions, according to one example embodiment. In one scenario, a session is defined as a single vehicle data collection that is contiguous in time. Each session is defined by a unique session ID. Unfortunately, sensor data is not delivered in this arrangement, rather sensor data is delivered in packages of data types (position, lane, signage, etc.). In one scenario, each package contains many session data types and the delivery does not identify which sessions are within each package. Therefore, the first step is to open each package, determine which sessions are included and then save the sessions to temporary session storage. After all packages and data types have been parsed, each session is combined into a single proto-buffer file containing all data for a single session ID.

In one embodiment, the map-matching module 203 may cause a map-matching of one or more data sessions with one or more map links. In one scenario, each session is map-matched to the existing map links. The map-matching identifies the link ID and the parameterized distance (or t-value) along the link. In one scenario, point based map-matching is not sufficient to reliably determine the correct mapping. A path (history) based map-matching must be applied in order to correctly map match links where ambiguity exits (e.g. ramps, and overpasses). The current source map-matching results in the largest source of error when computing curvature and slope; especially since the error are repeatable and are not easily detected by outlier removal. The errors are most likely due to the fact that the existing map-matched values are point based and do not include the forward/backward history of the path, which would aid in detecting map-match errors. As a result, sensor dataset may include raw GPS position data in addition to the map-matched locations. The map-matching module 203 may operate on the original raw position data and compute a match based on the extent of the available path/trace (i.e. shape based map-matching). In another embodiment, the map-matching module 203 may cause a map-matching of the position estimate values. Generally, all position information is stored in the position estimate section of the session proto-buffer file. Each position estimate contains a high resolution timestamp (0.001 seconds) and update rate of approximately one second. All other data events (e.g. signs, lane information, and dynamics) do not contain position information. Instead, they are defined by a timestamp associated with each event. This timestamp allows the position for the event to be precisely estimated by interpolation. A time based lookup is performed on the position estimate dataset and a resulting geo-location is linearly interpolated between the located position values that bound the timestamp. Thus, any event with a timestamp may employ this operation to obtain a valid geo-location. Due to this separation of position data from all other events, only the position estimate values are needed for map-matching. In fact, the map-matching module 203 may create a one-to-one map-match result for each position estimate. To obtain a map-matched result for a specific event, the map-matching module 203 may apply the same type of time-based lookup into the map-match results. In a further embodiment, the map-matching module 203 may map-match gaps. In one scenario, some portions of the drive session may not find a valid map-match solution. These portions of the session are removed from the solution. Some example situations might consist of drive traces collected off-road (driveways) or in parking lots. Removing the data early in the process prevents it from corrupting the curvature slope values for the correctly map-matched portion of the session. The slope-curvature solution then divides the data between holes as independent datasets and processes each separately.

In one embodiment, the computation module 205 computes the session data delivered from the previous process (i.e., the map-matched session data for a single drive which contains all position, lane, and dynamic, and map-match event types). The computation module 205 may apply computation independently per drive session. Therefore, this operation may run in parallel for each session. The output is a set of bucket update values derived from the session. These results are forwarded to the bucket processing module 207 which gathers buckets from multiple sessions. In one scenario, the slope curvature process implements a generic list class that performs operations on time ordered sets of objects. It provides a time based lookup with interpolation, data processing steps, and operations such as computing derivatives, standard deviations, and smoothing. For example, the storage of discrete position objects (1 Hz) in a ColumnFold object allows to easily query any interpolated position between the 1 Hz spaced position points. This class takes an input of timestamps and values (e.g. Doubles (yaw rate) or Objects (entire Position data structures)). It arranges the data in time order and allows a lookup function for any timestamp. This includes the ability to query if the lookup was within a valid region. A flag is thrown to request a time value that is outside the range of the dataset or in the middle of a gap/hole. The class also handles special case values such as undefined or null values. The result is that a clean dataset that is time ordered, interpolate-able, seek-able dataset that is immune to null values and gaps.

In one embodiment, the summary of the ColumnFold class is as follows. The data for the entire session is gathered into ColumnFold objects for each data type. This includes the following dataset: position estimate, dynamic longitudinal acceleration, dynamic yaw rate, dynamic velocity, lane change, and lane deviation.

i. Derivative of Velocity: Position Based Longitudinal Acceleration

An additional ColumnFold dataset is created for the derivative of velocity: dVelocity/dt or (dVelDt). This is required for Slope computation. This provides us with an acceleration based entirely on position change rather than the acceleration from the onboard sensor. Therefore, slope is computed based on the difference of computed dVelDt and the sensor provided longitudinal acceleration (which included gravity). In one scenario, when data smoothing was applied before combining the two sets of accelerations it skewed each of the two accelerations slightly differently. This resulted in even more skewed slope results since the differences between the accelerations were due to the smoothing skew rather than gravity differences. As a result, the computation module 205 applies a minimal amount of smoothing before slope and curvature are computed. After the values are computed, the computation module 205 applies an aggressive amount of smoothing (moving average).

First, the dynamic velocity values are prepared for reliably computing its derivative. A median filter is applied using three passes to clean the data.

dynamicVelocity.MedianFilter(3);

Then, the computation module 205 may compute the acceleration from the velocity.

dynamicVelDt=dynamicVelocity.CreateDerivative( );

Additionally, filter unexpected results:

dynamicVelDt<SLOPE_ACCELERATION_FILTER_MAX=3;

In one embodiment, the computation module 205 may consolidate one or more datasets to create a valid slope-curvature value at each velocity update. Therefore, the computation module 205 loops over each value in the dynamic velocity ColumnFold data list. In one scenario, for dynamic velocity time value, the computation module 205 obtains a time-based interpolated value for all the other datasets: dVelDt, LongAcc, YawRate, LaneChange, etc. If any value contains a dropout, gap, or null values, the time value is ignored.

```
For each (double time in dynamicVelocity)
{
        double velocity =   dynamicVelocity.GetDoubleValue(time);;
        double dVelDt =     dynamicVelDt.GetDoubleValue(time);
        double longAcc =    dynamicLongAcc.GetDoubleValue(time);
        double yawRate =    dynamicYawRate.GetDoubleValue(time) ;
    Compute curvature if velocity and yawRate valid
    Compute slope if dVelDt and longAcc valid
}
```

In one embodiment, the computation module 205 may cause a slope computation. In one scenario, the computation mechanism includes:
  Compute acceleration difference:
    dLongAccDiff=longAcc—dVelDt;
  Make sure dLongAccDiff is within expected values:
    Abs(dLongAccDiff)<GRAVITY
  Compute Slope:
    dSlopeAngleDeg=(Math.Asin (dLongAccDiff/GRAVITY)*180.0/Math.PI);

In one embodiment, the computation module 205 may cause a curvature computation. In one scenario, the computation module 205 may only compute curvature if velocity is much larger than zero. Otherwise, at slow velocities, the curvature values become unstable since velocity if the denominator of the curvature functions.
  velocity>CURVATURE FILTER MIN VELOCITY=3
  dCurvature=(yawRate/velocity)*(Math.PI/180.0);

In one embodiment, the computation module 205 may classify deviation to evaluate standard deviation for each dataset column at an interval of 1 second intervals. Based on past (learned) observations of expected StdDev values, the computation module 205 may remove data in 1 second intervals if the dataset set's StdDev is more than 2 sigma different than the expected deviation.
  Over 1 second intervals: Skip data if StdDevInterval>2*StdDevExpected In one scenario, the raw sensor data is very noisy. Therefore, the computation module 205 may apply smoothing to determine stable values. First, the computation module 205 may smooth each range (between gaps) independently so that the gaps do not affect the result. In one scenario, a moving average operation is applied over a window of 1 second to provide smooth values. The current process discards one half of the points in the first and last window to prevent uneven smoothing to different areas of the dataset.

In one embodiment, the bucket processing module 207 is responsible for collecting bucket update messages from the previous computation operation. The bucket processing module 207 may maintain a global, persistent set of buckets for all links. Further, the bucket processing module 207 may maintain a separate bucket for slope and curvature. Each bucket is handled independently without knowledge of its neighbors. The updates are gathered into their respective buckets until enough 'reliable' data has been gathered from multiple drive sessions. The bucket processor computes variance statistics each time an update is applied. The variance is used to determine if the sensor produced slope-curvature values are reliable and consistent enough to use. In one scenario, excluding outliers, once enough data has been evaluated as reliable, it is compared to the existing map's value. The value is either flagged validated, or updated. If the computed value matches the existing map value, the validated flag is applied to the bucket. If the computed value deferrers significantly (e.g., >2*sigma of expected error), then the bucket is flagged as updated. In one scenario, the flag status values specified in this bucket process is observed by the Strand Process until it deems the values are ready to be forwarded to map republishing.

In one embodiment, the bucket processing module 207 may maintain the contents of one or more buckets. A bucket is defined as a single container that represents a 10 m section of a link. Each link is defined by a virtual set of bucket IDs until a real bucket is constructed with the first drive session. The buckets for a specific link are numbered 0 to N (sequence ID) indicating the location along the link. The bucket 7 may mean the bucket is 70 m from the start of the link. Each buckets may contain the following information:
  Link ID
  Bucket Sequence ID
  Type (slope or curvature)
  Start Spline t-value
  End Spline t-value
  Control Value
  Samples: List of [BucketUpdateMessage]

In one embodiment, the bucket processing module 207 may monitor the bucket update queue. The bucket for each update is looked up in the bucket database. If the bucket does not yet exist for the link ID and bucket index, then a new bucket is created. The update information is merged with existing data in the bucket and statistical analysis is performed to see if any action should take place. In another example embodiment, upon a new bucket creation, the control value for the existing map slope-curvature is determined by the bucket processing module 207 for the bucket. This value is later used to compare the difference between sensor based values and map values. When the control value is found to be significantly different than the sensor based computed value, the bucket status flag is set. In one scenario, the minimum count to initiate testing is three to five overlapping drive sessions (meaning they are added to the same bucket). This is just the number to initiate the processing, not the number needed to instigate a map change. The minimum sample count is just the limit needed to start computing statistics.

In one embodiment, the presentation module 209 obtains a set of summary statistics from other modules, and continues with providing a presentation of the updated slope and curvature maps. In another embodiment, the presentation module 209 may cause a presentation of updated slope and curvature maps based, at least in part, on data density information, network information, or a combination thereof. In a further embodiment, the presentation module 209 may cause a presentation of updated slope and curvature maps based on time-based information, routing information, preference information, or a combination thereof.

In one embodiment, the user interface module 211 employs various application programming interfaces (APIs) or other function calls corresponding to the applications 103 of the UE 101, thus enabling the display of graphics primitives such as maps, menus, data entry fields, etc., for generating the user interface elements. By way of example, the user interface module 211 generates the interface in response to APIs or other function calls corresponding to the browser application of the UE 101, thus enabling the display of graphics primitives. In another embodiment, the user interface module 211 may cause a presentation of one or more updated slope and curvature maps in at least one user interface element of a user interface, wherein the representation of the updated slope and curvature maps include, at least in part, a panning, a highlighting, a raising, a thickening, or a combination thereof.

The above presented modules and components of the configuration platform 109 can be implemented in hardware, firmware, software, or a combination thereof. Though depicted as a separate entity in FIG. 1A, it is contemplated that the configuration platform 109 may be implemented for direct operation by respective UE 101s. As such, the configuration platform 109 may generate direct signal inputs by way of the operating system of the UE 101 for interacting with the applications 103. In another embodiment, one or more of the modules 201-211 may be implemented for operation by respective UE 101s, as a configuration platform 109, or combination thereof. Still further, the configuration platform 109 may be integrated for direct operation with the services 115, such as in the form of a widget or applet, in accordance with an information and/or subscriber sharing arrangement. The various executions presented herein contemplate any and all arrangements and models.

Figure 3:
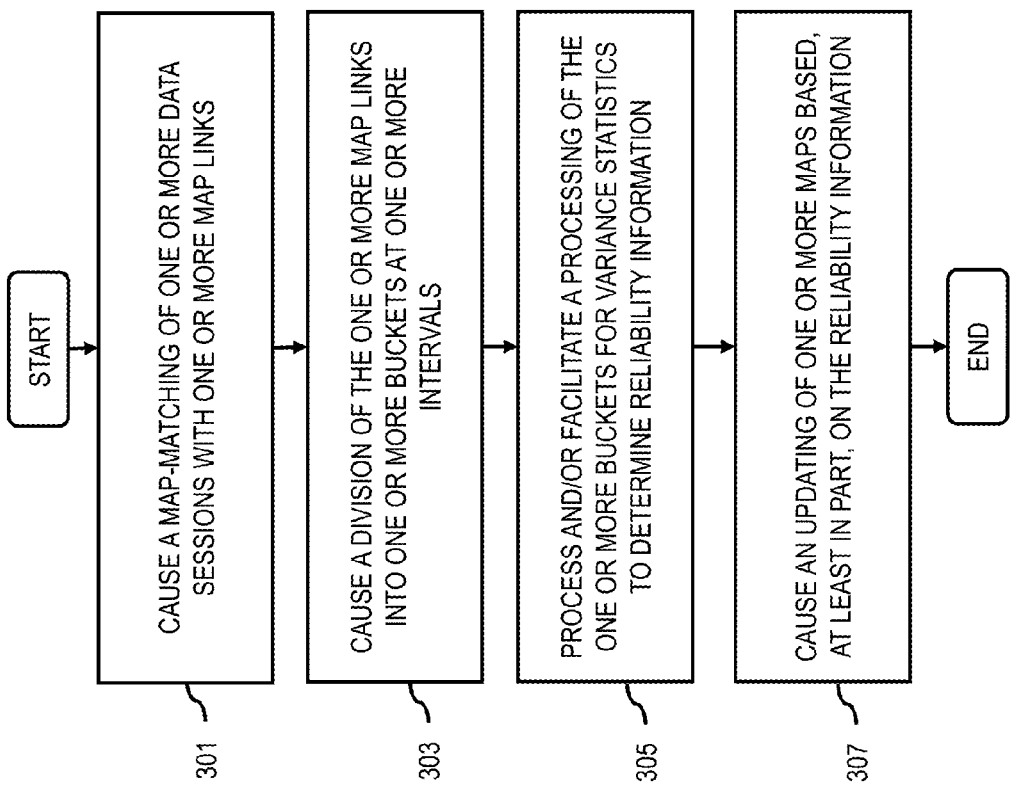
FIG. 3 is a flowchart of a process for causing an updating of one or more maps based on reliability information, according to one embodiment.

FIG. 3 is a flowchart of a process for causing an updating of one or more maps based on reliability information, according to one embodiment. In one embodiment, the configuration platform 109 performs the process 300 and is implemented in, for instance, a chip set including a processor and a memory as shown in FIG. 37.

In step 301, the configuration platform 109 may cause, at least in part, a map-matching of one or more data sessions with one or more map links, wherein the one or more data sessions represent one or more location data packages associated with a vehicle. In one embodiment, the one or more location data packages includes, at least in part, position information, lane information, signage information, or a combination thereof. In another embodiment, the map-matching includes, at least in part, a point based map-matching, a path based map-matching, a shape based map-matching, or a combination thereof.

In step 303, the configuration platform 109 may cause, at least in part, a division of the one or more map links into one or more buckets at one or more intervals. In one scenario, slope-curvature values are provided for the entire session at a frequency of 50 Hz. The data is provided at a higher frequency, and in voluminous quantity. Practically, the sensor data has a stable resolution of 1 Hz. Therefore, in order to make the data available for multisession clustering 50 Hz session slope-curvature values is reduced into discrete buckets of data. In one example embodiment, at least one map link may be divided into buckets at 10 m intervals. Any bucket might be uniquely defined by a link ID and bucket count within the link.

In step 305, the configuration platform 109 may process and/or facilitate a processing of the one or more buckets for variance statistics to determine reliability information for acceleration slope values, acceleration curvature values, or a combination thereof calculated from the one or more location data packages. In one scenario, the configuration platform 109 may cause an independent processing of each bucket. The buckets are processed until reliable data are gathered from multiple drive sessions, and the respective buckets are continuously updated.

In step 307, the configuration platform 109 may cause, at least in part, an updating of one or more maps based, at least in part, on the reliability information. In one scenario, the process of updating involves computing variance statistics to determine if the sensor produced slope-curvature values are reliable and consistent to use. The process also involve excluding outliers. The configuration platform 109 may compare data determined to be reliable to the existing map's value.

Figure 4:
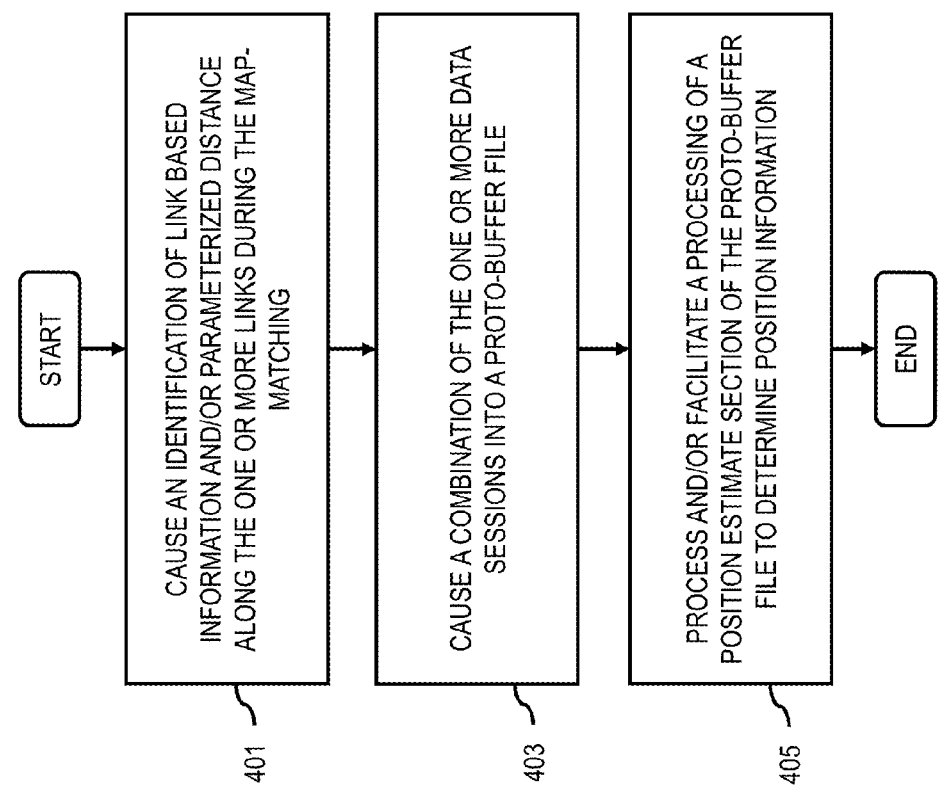
FIG. 4 is a flowchart of a process for identifying information for one or more links, and processing proto-buffer file to determine position information, according to one embodiment.

FIG. 4 is a flowchart of a process for identifying information for one or more links, and processing proto-buffer file to determine position information, according to one embodiment. In one embodiment, the configuration platform 109 performs the process 400 and is implemented in, for instance, a chip set including a processor and a memory as shown in FIG. 37.

In step 401, the configuration platform 109 may cause, at least in part, an identification of link based information, parameterized distance along the one or more links, or a combination thereof during the map-matching. In one scenario, data are delivered in packages, and each package contains many session data types. Hence, each package is processed to identify the session data type that is included. Then, the packages and data types are parsed, wherein each session is combined into a single proto-buffer file containing all data for a single session ID. Subsequently, each session is map-matched to the existing map links. Then map-matching identifies that link ID and the parameterized distance (or t value) along the link.

In step 403, the configuration platform 109 may cause, at least in part, a combination of the one or more data sessions into a proto-buffer file. In one scenario, after one or more packages are parsed, each session is combined into a single proto-buffer file containing all data for a single session ID. A single proto-buffer file contains all information that is required for slope-curvature computation for a single Session ID.

In step 405, the configuration platform 109 may process and/or facilitate a processing of a position estimate section of the proto-buffer file to determine position information. In one embodiment, the position information includes, at least in part, timestamp information, update information, or a combination thereof. In general, position information is stored in the position estimate section of the session proto-buffer file. Each position estimate contains a high resolution timestamp and an update rate of approximately one second. All other data events (e.g. signs, lane information, and dynamics) do not contain position information, and are defined by a timestamp associated with each event. This timestamp allows the position for the event to be precisely estimated by interpolation.

Figure 5:
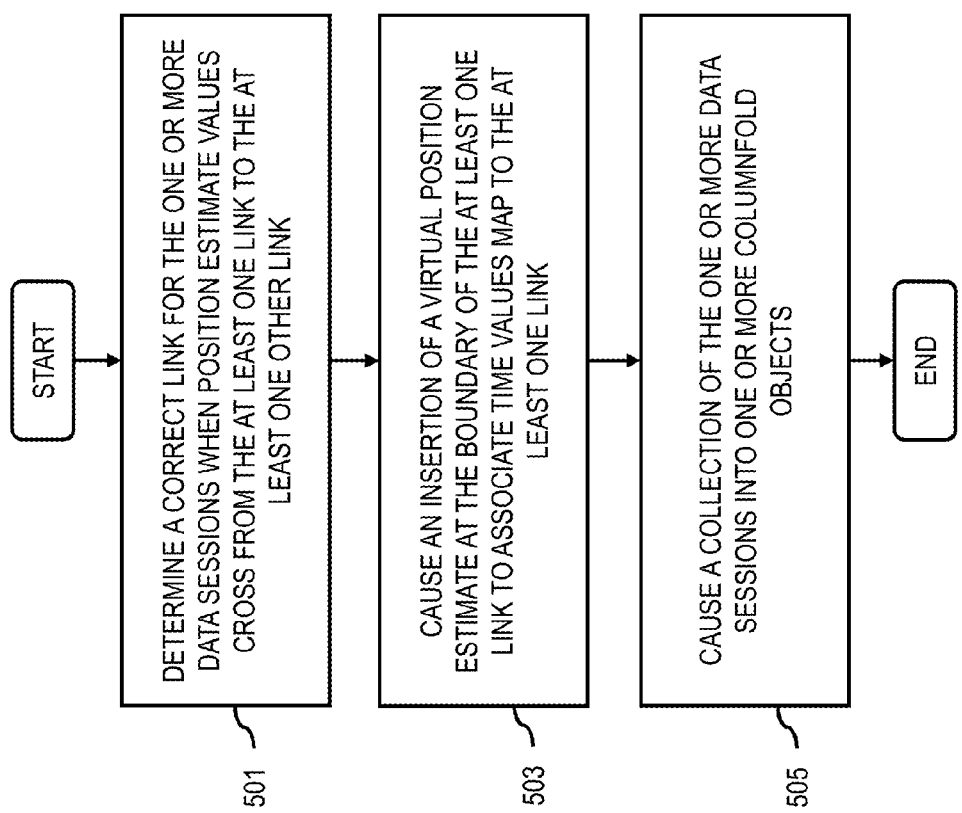
FIG. 5 is a flowchart of a process for causing an insertion of a virtual position estimate, and causing a collection of data sessions into columnfold objects, according to one embodiment.

FIG. 5 is a flowchart of a process for causing an insertion of a virtual position estimate, and causing a collection of data sessions into columnfold objects, according to one embodiment. In one embodiment, the configuration platform 109 performs the process 500 and is implemented in, for instance, a chip set including a processor and a memory as shown in FIG. 37.

In step 501, the configuration platform 109 may determine a correct link for the one or more data sessions when position estimate values cross from the at least one link to the at least one other link. In one scenario, a position estimate values may cross from one link to another link. In such circumstances, extra map-matching information is required otherwise correct link for an event may become ambiguous.

In step 503, the configuration platform 109 may cause, at least in part, an insertion of a virtual position estimate at the boundary of the at least one link to associate time values map to the at least one link. In one scenario, the configuration platform 109 may have to provide a specific map-match for each events when a position estimate values crosses from one link to another link. Instead, the configuration platform 109 may insert a virtual position estimate at the link boundary to allow events to know precisely which time values maps to which link. This process requires a reverse projection to determine where the link endpoint projects onto the position estimate polyline.

In step 505, the configuration platform 109 may cause, at least in part, a collection of the one or more data sessions into one or more columnfold objects. In one embodiment, the one or more columnfold objects include position estimate, dynamic longitudal acceleration, dynamic yaw rate, dynamic velocity, lane change, lane deviation, or a combination thereof.

Figure 6:
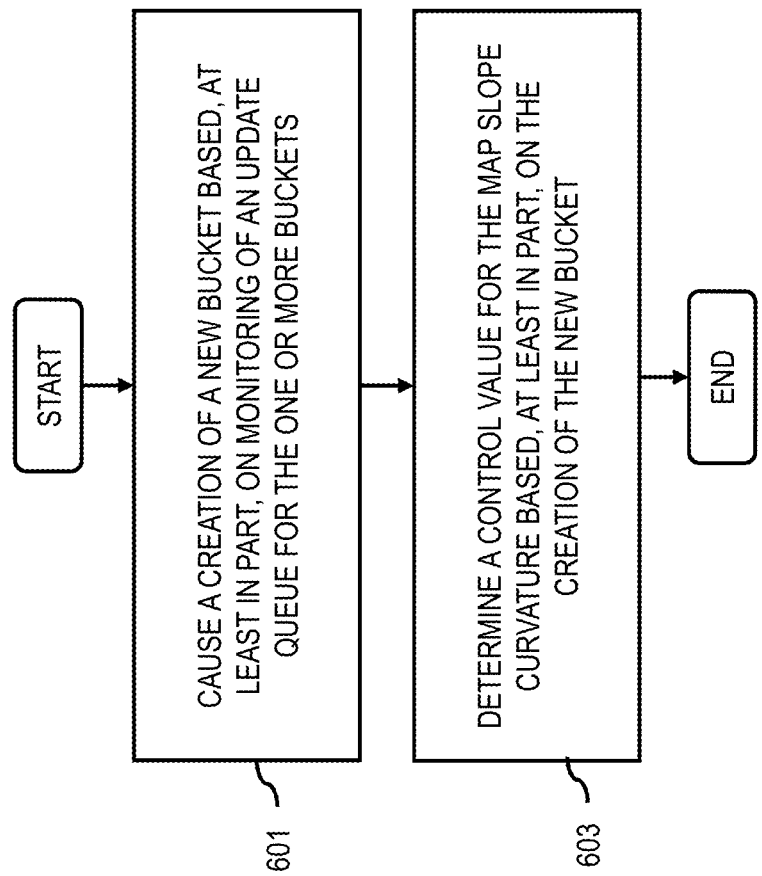
FIG. 6 is a flowchart of a process for creating a new bucket, and determining a control value for a map slope curvature, according to one embodiment.

FIG. 6 is a flowchart of a process for creating a new bucket, and determining a control value for a map slope curvature, according to one embodiment. In one embodiment, the configuration platform 109 performs the process 600 and is implemented in, for instance, a chip set including a processor and a memory as shown in FIG. 37.

In step 601, the configuration platform 109 may cause, at least in part, a creation of a new bucket based, at least in part, on monitoring of an update queue for the one or more buckets. In one scenario, the configuration platform 109 may monitor the bucket update queue. The bucket for each update is looked up in the bucket database. If the bucket does not exist for the link ID and bucket index, then a new bucket is created.

In step 603, the configuration platform 109 may determine a control value for the map slope curvature based, at least in part, on the creation of the new bucket. In one scenario, when a new bucket is created, the control value for the existing map slope-curvature is determined for the bucket. This value is later used to compare the difference between sensor based values and the map values. In another scenario, when the control value is determined to be significantly different than the sensor based computed value, the bucket status flag is set.

Figure 7:
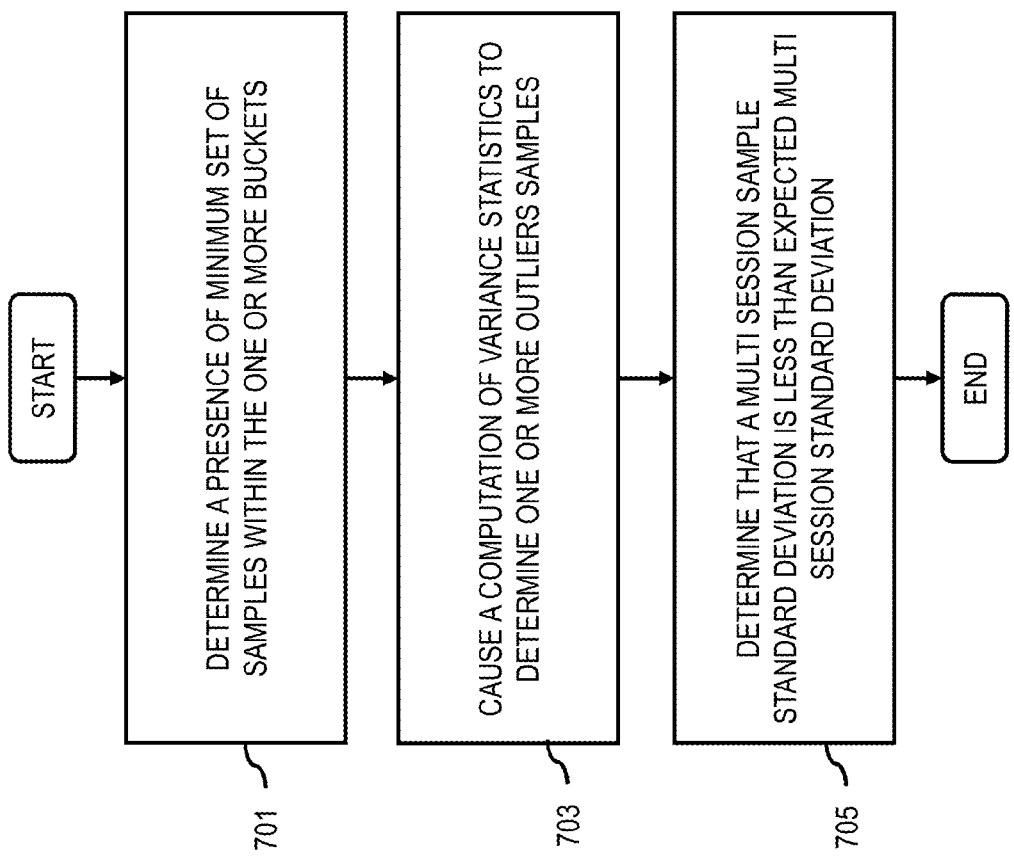
FIG. 7 is a flowchart of a process for determining outliers samples from a set of samples within one or more buckets, and also determine multi session sample standard deviation, according to one embodiment.

FIG. 7 is a flowchart of a process for determining outliers samples from a set of samples within one or more buckets, and also determine multi session sample standard deviation, according to one embodiment. In one embodiment, the configuration platform 109 performs the process 700 and is implemented in, for instance, a chip set including a processor and a memory as shown in FIG. 37.

In step 701, the configuration platform 109 may determine a presence of minimum set of samples within the one or more buckets. In one scenario, the minimum set of sample is the minimum sample count that is required to initiate computing statistics. In one example embodiment, the minimum set of sample count to initiate testing may be three to five overlapping drive sessions (meaning they are added to the same bucket).

In step 703, the configuration platform 109 may cause, at least in part, a computation of variance statistics to determine one or more outliers samples. In one scenario, when minimum set of samples (each from a different session) within a bucket is reached, the configuration platform 109 may compute variance statistics to determine which samples are outliers.

In step 705, the configuration platform 109 may determine that a multi session sample standard deviation is less than expected multi session standard deviation. In one scenario, after outliers' removal, if there is a combination of at least three to five samples that has a standard deviation less than the accepted deviation, then the bucket is ready for setting its status flag. Otherwise, the bucket must wait for more updates from another drive session.

Figure 8:
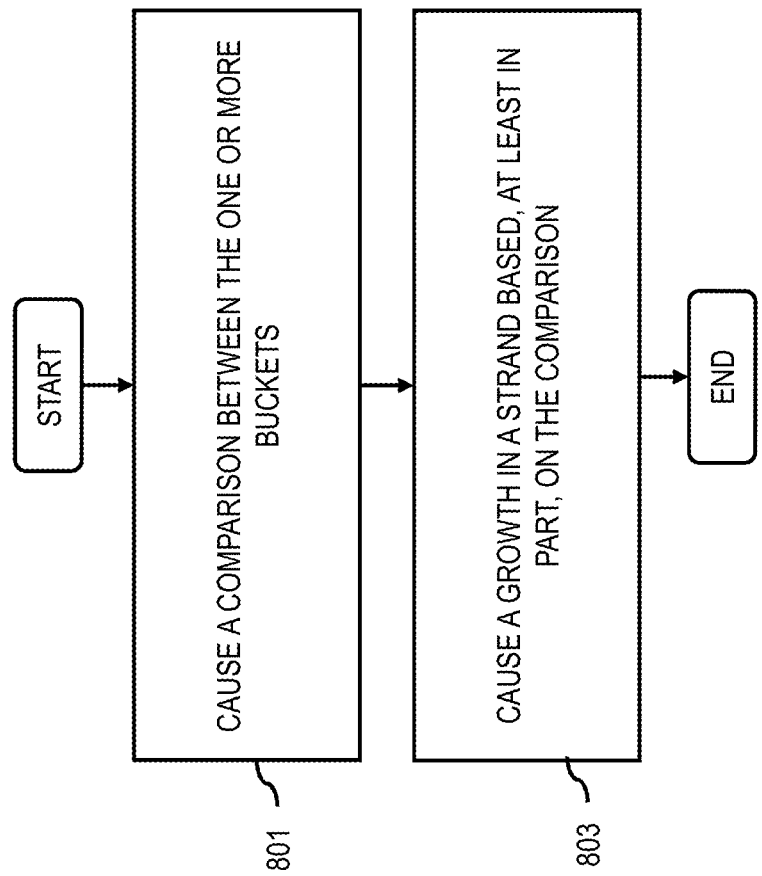
FIG. 8 is a flowchart of a process for causing a comparison between one or more buckets, and cause a growth in a strand based on the comparison, according to one embodiment.

FIG. 8 is a flowchart of a process for causing a comparison between one or more buckets, and cause a growth in a strand based on the comparison, according to one embodiment. In one embodiment, the configuration platform 109 performs the process 800 and is implemented in, for instance, a chip set including a processor and a memory as shown in FIG. 37.

In step 801, the configuration platform 109 may cause, at least in part, a comparison between the one or more buckets. In one embodiment, the comparison includes, at least in part, bucket identification, bucket flag values, or a combination thereof. In one scenario, one or more buckets are compared to their neighbors along each links. In another scenario, the strand process only requires comparison of the bucket ID and the bucket flag values between one or more buckets.

In step 803, the configuration platform 109 may cause, at least in part, a growth in a strand based, at least in part, on the comparison. As discussed, the he Bucket processing operates on each bucket independently, and has no association with its neighbors. Therefore, strand processing is responsible for associating the neighboring buckets. If each successive neighboring buckets contain the same status flag, the strand is grown. However, for buckets that is undefined, or different than its neighbor the strand is broken. In one scenario, any strands which reach a threshold length are considered stable for map updates.

Figure 9:
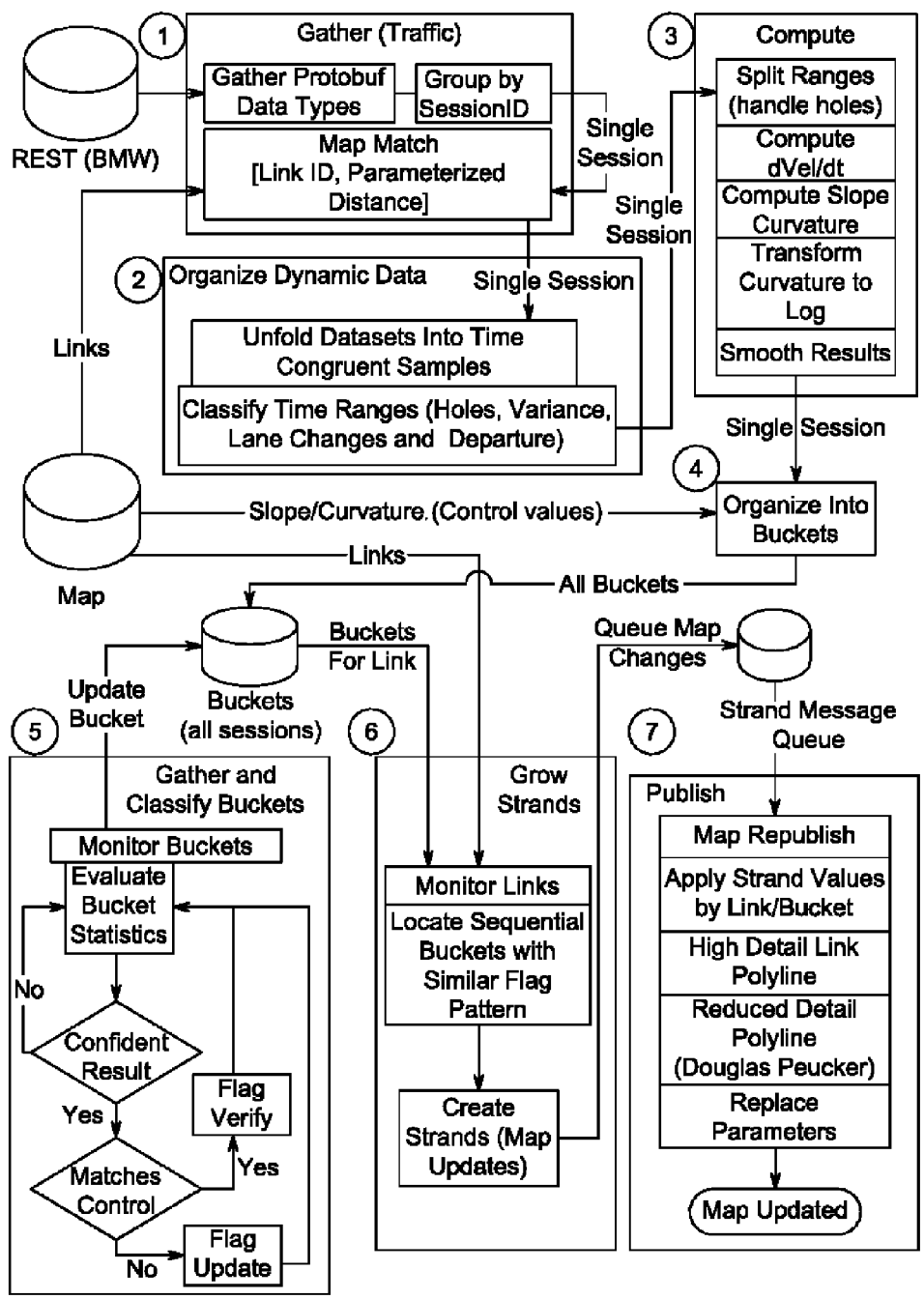
FIG. 9 is a flow diagram that represents the slope curvature process overview, according to one example embodiment.

FIG. 9 is a flow diagram that represents the slope curvature process overview, according to one example embodiment. In one scenario, the process describes how sensor data are assembled and processed into usable slope and curvature that is then provided as updates to the original map. This process is divided into four distinct Regions:

1. Session Processing [session based]
    Input: Raw Senor Bucket Data from REST service
    Output: Buckets of Slope and Curvature mapped to map links
    Parallel processing by drive session
    Sub-processes:
    a. Gather Sessions
    b. Map-Match Session
    c. Unfold Discrete Time to Continuous (align multi-sensor data)
    d. Compute
    e. Smooth
2. Aggregate & Monitor Buckets [link bucket]
    Input: Link based slope and curvature and source map curvature/slope
    Output: Classified bucket sets indicate
    Parallel processing by bucket
3. Strand Detection [Inter-bucket pattern detection]
    Input: Link sequential buckets
    Output: Strands of sequential buckets flagged as map updates; also verification of
    existing map curvatures
    Parallel processing by link
4. Republish [Map]
    Input: Buckets Strands and verification
    Output: Updated map polyline values for slope and curvature The first step involves the majority of data preparation and computation. This process mainly involves independent processing on single drive sessions. Then, steps 2 and 3 involve joining data from multiple sessions into buckets. A unique bucket is defined every 10 meters along a map link. The buckets accumulate data from multiple sessions until it is determined that the consolidated values are good enough to either verify or modify the existing map slope or curvature value, or segments along map links are used to cluster the bulk results into recognizable differences compared to the existing map. This step produces strands that identify modified values. Finally, the strands delivered as modifications to the original map.

Figure 10:
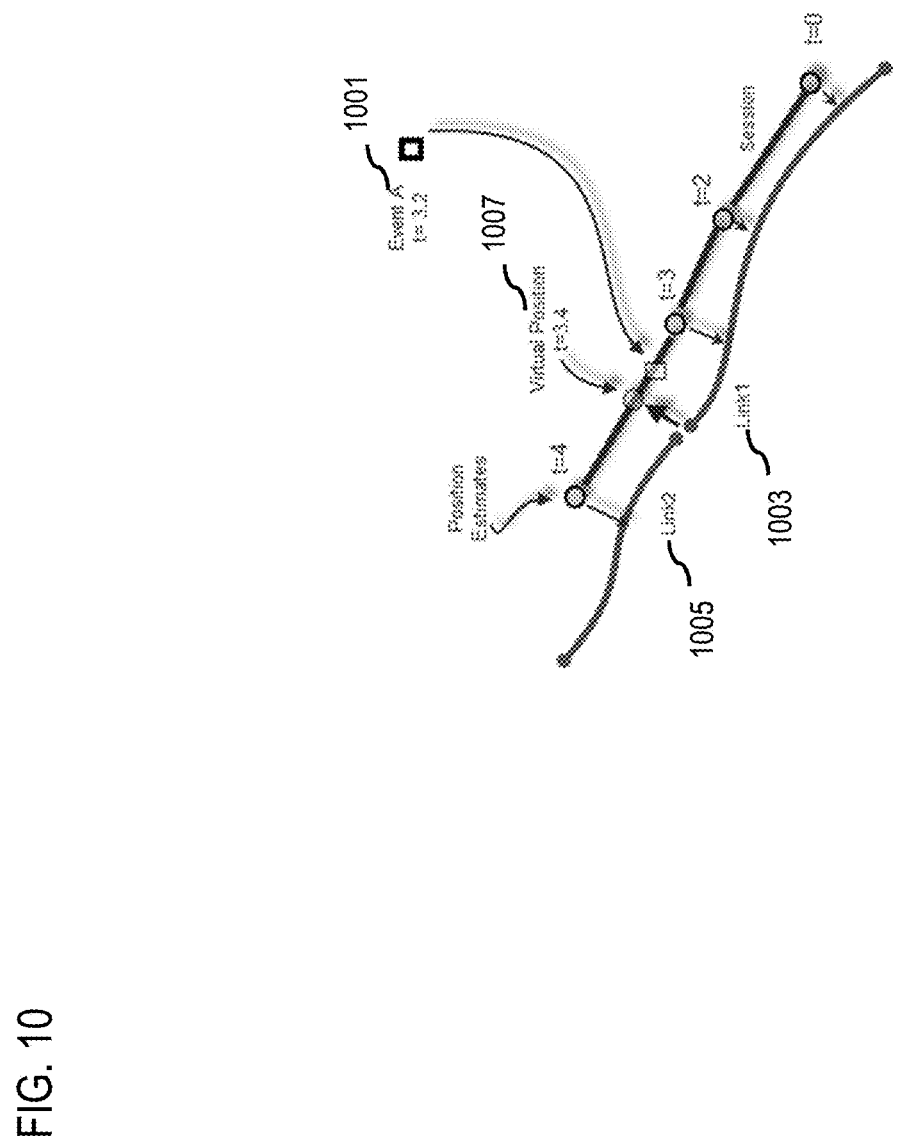
FIG. 10 is a diagram that represents virtual position estimation, according to one example embodiment.

FIG. 10 is a diagram that represents virtual position estimation, according to one example embodiment. In general, a single map-matching result is computed for each position estimate data point. Link-matching may be interpolated for all other events. However, when the position estimate values cross from one link to another as represented by FIG. 10, there is a need to provide some extra map-matching information. Otherwise, the correct link for an event at these end locations is ambiguous. This results in the requirement of providing a specific map-match for each of these events. As a result, the configuration platform 109 may insert a virtual position estimate at the link boundary to allow events to know precisely which time values map to which link. This requires a reverse projection to determine where the link endpoint projects onto the position estimate polyline. In one example embodiment, event A 1001 is attached to a map link. As provided, event A occurs at time=3.2. It is also provided that time=3 maps to Link 1 1003, and time=4 maps to link 2 1005. The configuration platform 109 may use the virtual position estimate 1007 to determine that any time less than 3.4 is on link 1. Therefore, it is determined that Event A is on Link1.

FIG. 11 is a diagram that represents a match result list, according to one example embodiment. In one scenario, the map-matching process generates a list set of map-match results which are stored along with the original session dataset. Each match result is stored as follows:

MatchResult: [Timestamp 1101, Latitude 1103, Longitude 1105, Altitude 1107, Link ID 1109, Parameter Distance 1111, Status 1113]

In one scenario, each session position estimate has a corresponding match result. If the position estimate failed map-matching, then all values except the time are NULL (e.g., row 1115). In addition, virtual match results are added at link boundaries. This process results in a single proto-buffer file which contains all information required for slope-curvature computation for a single Session ID.

Figure 12:
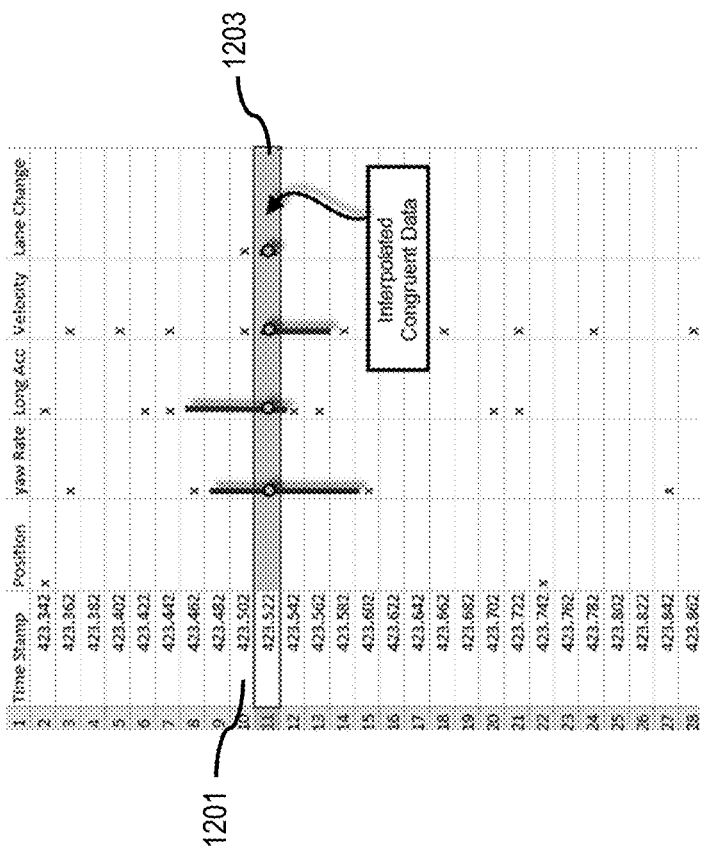
FIG. 12 is a diagram that represents time staggered converted to time congruent, according to one example embodiment.

FIG. 12 is a diagram that represents time staggered converted to time congruent, according to one example embodiment. In one scenario, each drive session contains many data events from various sensors. Each sensors collect data at its on rate and thus each has its own timestamp. While all Timestamps should belong to the same epoch (absolute values are interchangeable), the data is staggered since the collections have their own independent capture sequences. Therefore, the data is staggered, for example, the yaw rate may be captured at t=1.434, then the velocity might be captured at t=1.437, then again at t=1.439, then the yaw rate again at t=1.440. Since there is a need to obtain and compare values from different sensors, the configuration platform 109 un-folds the staggered data into a congruent set of data at any specific timestamp. In one example embodiment, FIG. 12 displays a typical arrangement of data in time order, but staggered. At time 423.502, velocity and lane change are available (e.g., row 1201), but the longitudinal acceleration is 0.08 seconds old. To obtain a congruent dataset at time 423.522, the values in each column are linearly interpolated to obtain a best estimate of each sensor value at that exact time (e.g., row 1203). In addition, some data types will occasionally drop-out and may not contain updates for a significant period. These drop-out holes must be handled appropriately so that they do not corrupt dependent calculations. This is especially important to prevent interpolating between values that are significantly different in time. Therefore, a class is created to organize data by time, allow interpolation, handle holes, clean data and perform basic data filtering operations.

Figure 13:
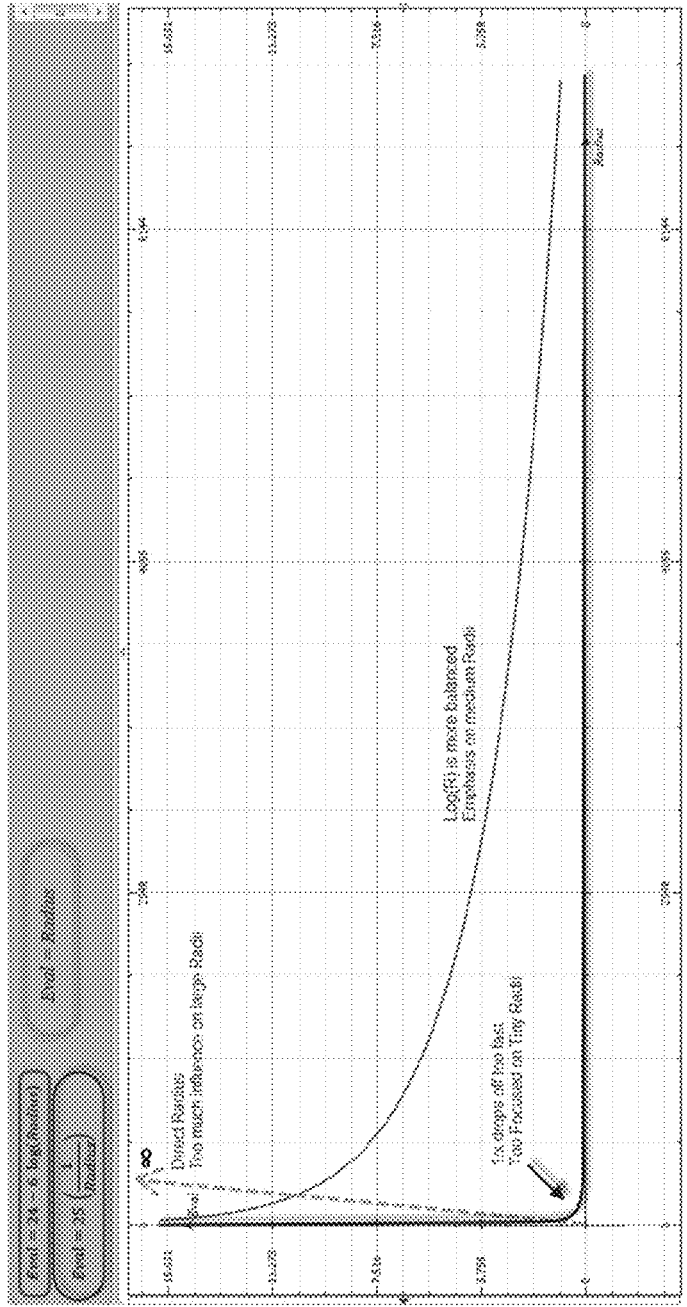
FIG. 13 is a graph diagram that represents curvature compared to logarithmic model, according to one example embodiment.

FIG. 13 is a graph diagram that represents curvature compared to logarithmic model, according to one example embodiment. In one scenario, the usage of curvature and curvature of radius values is non-linear. The configuration platform 109 may stress on the accuracy of ranges of curvature rather than the exact values, for example, when the road is straight, the curvature of radius may alternate between positive and negative infinity. Therefore, these values along straight sections of road may skew any attempt at obtaining a meaningful accuracy. This is especially important when trying to evaluate the accuracy statistics over multiple datasets. In one scenario, the curvature values may be used rather than radius (reciprocal of Radius). However, this value is also skewed toward very small radii.

In one scenario, the configuration platform 109 may emphasize on bins of curvature ranges. In one example embodiment, the configuration platform 109 may simply convert the curvature to a signed bin number where the bin ranges might consist of:

R=[10000, 5000, 2500, 1000, 750, 500, 300, 200, 150, 125, 100, 75, 50, 25, 10]

The configuration platform 109 may group nearby linear roads (>10000) into a single bucket and so on. This provides a buffer against a single range from dominating the statistics. Essentially this is a logarithmic scale. In order to maintain full precision, the configuration platform 109 may implement a truncated logarithmic transform. The truncation is to eliminate values out of the range of interest: Clamp Radius values between 14 m and 10000 m. For all internal processing and statistics, the configuration platform 109 operates on the log mapped values rather than curvature directly. When the configuration platform 109 finally publishes the values, they are converted from Log back into standard curvature.

The model defines a signed value with 18 values for each direction (signed). This can be thought of as having 36 bins to arrange the curvature values. A standard deviation value of 1.5 would mean having an accuracy within 1.5 bins at 70% confidence.

Log Mapped Curvature, N:
Bound Input: 14<=Radius<=10000
$L=6*Log_{10}$ (Radius) [Range 6<L<24]
Reverse so that the N=0 at the signed value transition when R transitions from+infinity to−infinity:
N−24−L
Therefore a value ranges of:
Radii=[−100, −30000, 20000, 5000, 100, 10]
Would map to:
N=[−12, 0, 0, 1.81, 12, 17.12]

Figure 14:
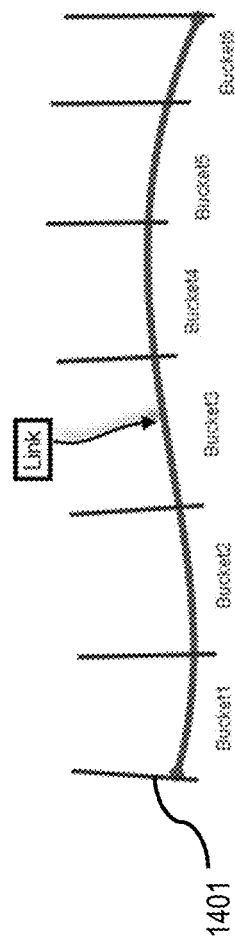
FIG. 14 is a diagram that represents one or more link buckets, according to one example embodiment.

FIG. 14 is a diagram that represents one or more link buckets, according to one example embodiment. In one scenario, other than at holes, the current slope-curvature values are provided for the entire session at a frequency of about 50 Hz. This is a lot of data and at a higher frequency than is needed for the output maps. In addition, it is at a higher frequency than the actual underlying resolution of the sensor data. Realistically, the sensor data has a stable resolution of 1 Hz. Also, each session is processed independently. In order to make the data available for multisession clustering the configuration platform 109 reduces the above 50 Hz session slope-curvature values into discrete buckets of data [1401]. Each map link is divided into buckets at 10 m intervals along the link. Any bucket might be uniquely defined by a link ID and bucket count within the link, for example, Bucket ID=452435$_{13}$10 for bucket #10 on link 452435.

Figure 15:
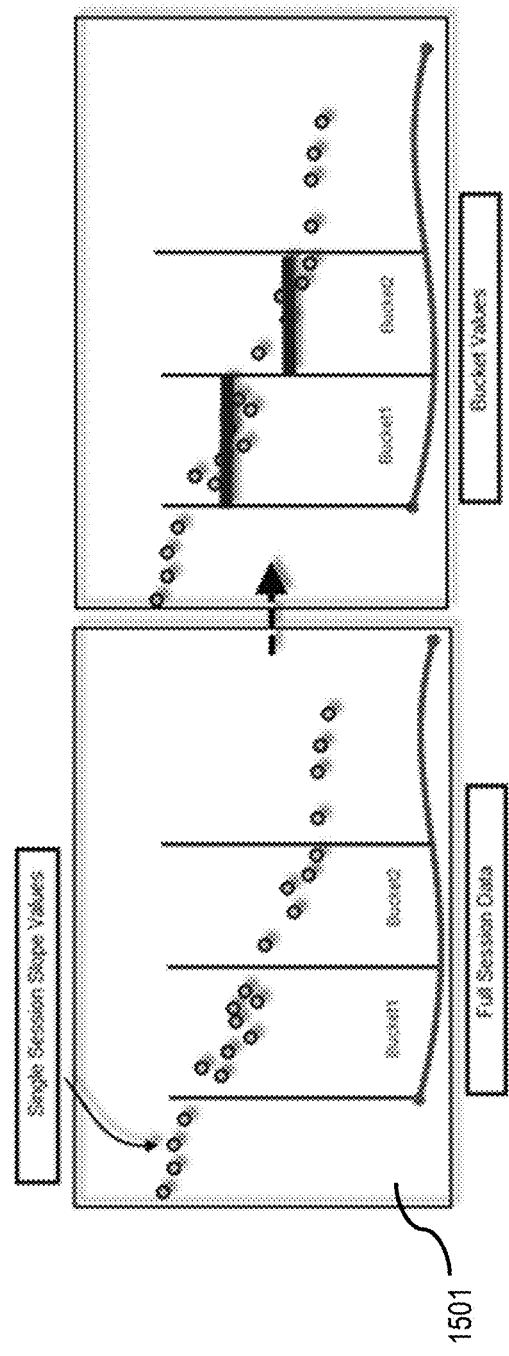
FIG. 15 is a diagram that represents full session data and bucket values, according to one example embodiment.

FIG. 15 is a diagram that represents full session data and bucket values, according to one example embodiment. In one scenario, all 50 Hz data points that fall within a single bucket are averaged into a single value [1501]. Henceforth, the configuration platform 109 may also store the standard deviation of the points used to create the single value for determining a confidence when joining with other session's buckets. In order to make processing more efficient, the buckets may be delivered as update messages to the bucket processing operation that waits for bucket update events. In one scenario, a bucket update event may be defined as:

BucketUpdateMessage: [Bucket ID, Session ID, Time, Type, Value]

Figure 16:
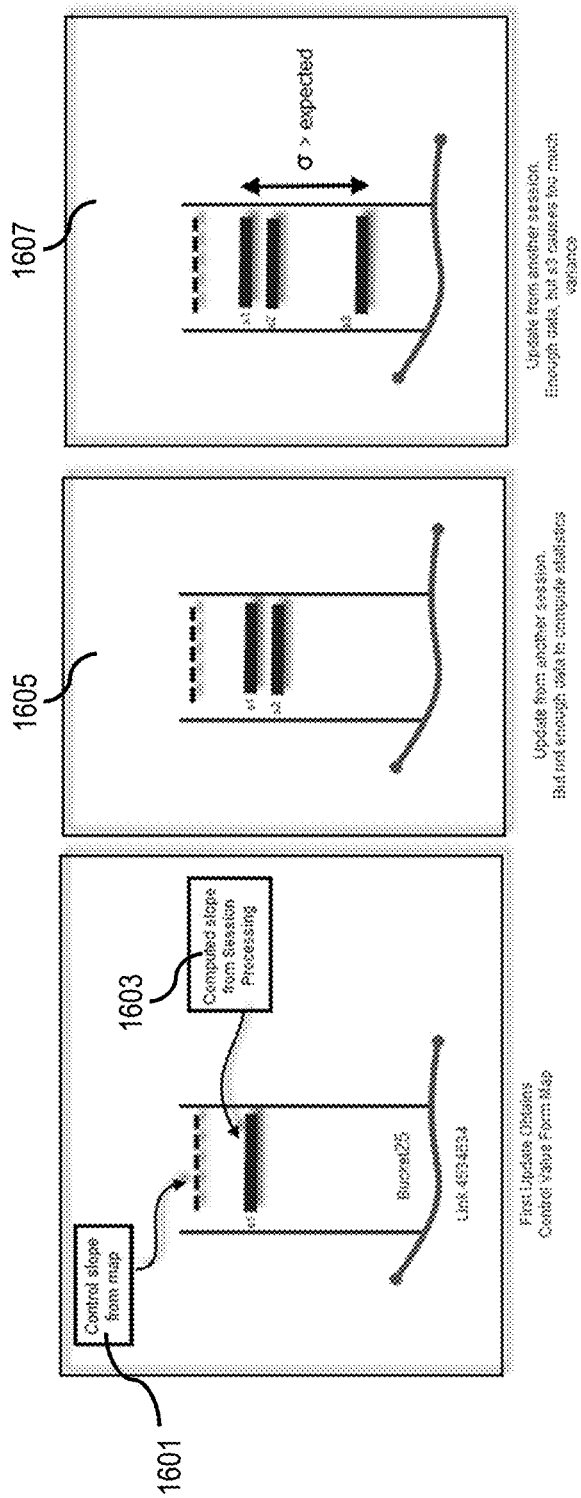
FIG. 16 is a diagram that represents bucket building, according to one example embodiment.

Where:
Bucket ID Link ID+LinkBucketIndex
Session ID Replace existing session if already in bucket
Time Indicate freshness of data
Type Slope or curvature
Value Slope or curvature (Log) value FIG. 16 is a diagram that represents bucket building, according to one example embodiment. In one scenario, when the minimum set of samples (each from a different session) within a bucket is reached, variance statics are computed to determine which samples are outliers. After the outlier removal, if there is a combination of at least (3-5) samples that has a standard deviation less than the accepted deviation, then the bucket is ready for setting its status flag. Otherwise, the bucket must wait for more updates from another drive session. In one example embodiment, MultisessionSample_STDdev<ExpectedMultiSession_STDdev. represents a scenario wherein control slope from map 1601 and computed slope from session processing 1603 are obtained. FIG. 1605 represents a scenario wherein updates from another session are received but the data is not enough to compute statistics. FIG. 1607 represents a scenario wherein update from another session is received and the data is enough to compute statistics, but the s3 causes too much variance.

Figure 17:
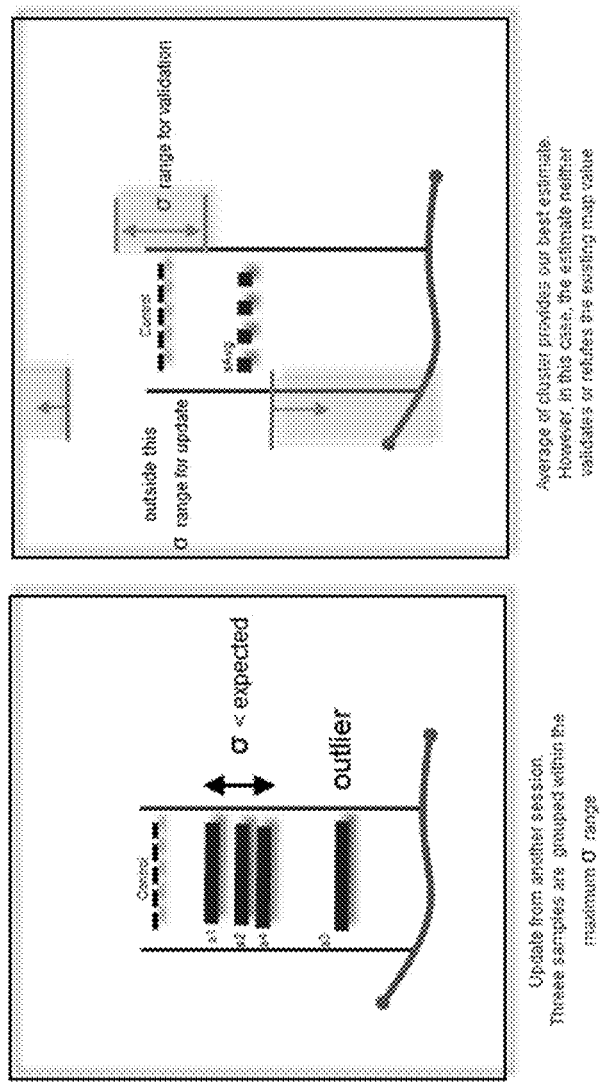
FIG. 17 is a diagram that represents a scenario wherein variance accuracy is achieved but the resulting value is still ambiguous, according to one example embodiment.

FIG. 17 is a diagram that represents a scenario wherein variance accuracy is achieved but the resulting value is still ambiguous, according to one example embodiment. In one scenario, when the computed variance is acceptable, the values involved are averaged (clustered samples) to determine a single estimate of the new curvature-slope value for the bucket. Based on the sessions processed so far, this is value estimate of the slope-curvature at this distance along the link.

ComputedAvg=Average (clustered samples)

In one scenario, the value is compared against the control value from the map. Then, the configuration platform 109 may either verify the existing map value or replace the existing map value.

MapDeviation=MapControl−ComputedAvg

In order to verify the existing map value, the configuration platform 109 may need to exceed the expected variation of the computed values. In one scenario, the values may be within the expected deviation at 90% confidence (1/2 sigma).

Figure 18:
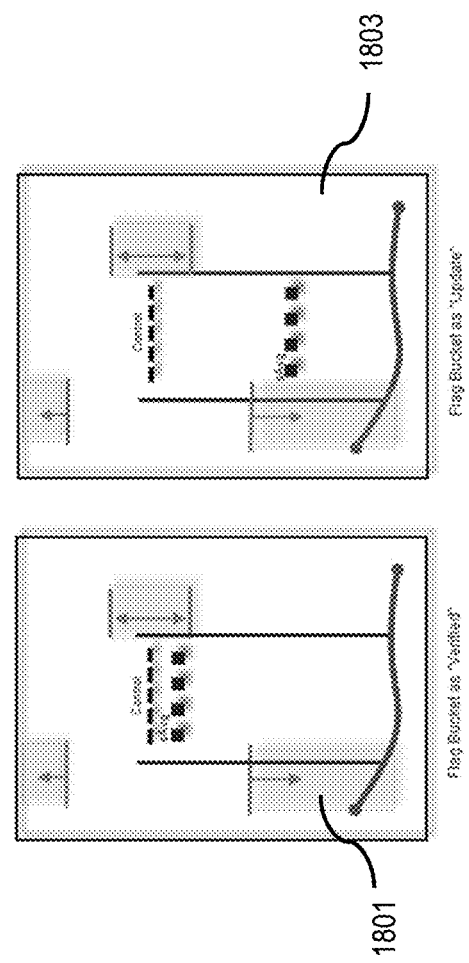
FIG. 18 is a diagram that represents flag examples, according to one example embodiment.

FIG. 18 is a diagram that represents flag examples, according to one example embodiment. In one scenario, the configuration platform 109 may flag a bucket as verified 1801 or as update 1803 based, at least in part, on the following circumstances:

Flag as verified if MapDeviation<0.5*Expended

In order to cause a map update, the computed value must be significantly different from the existing map value. For now, the map update is initiated if the difference if greater than 3 times the standard deviation.

Flag as update if MapDeviation>3.0*Expended

Figure 19:
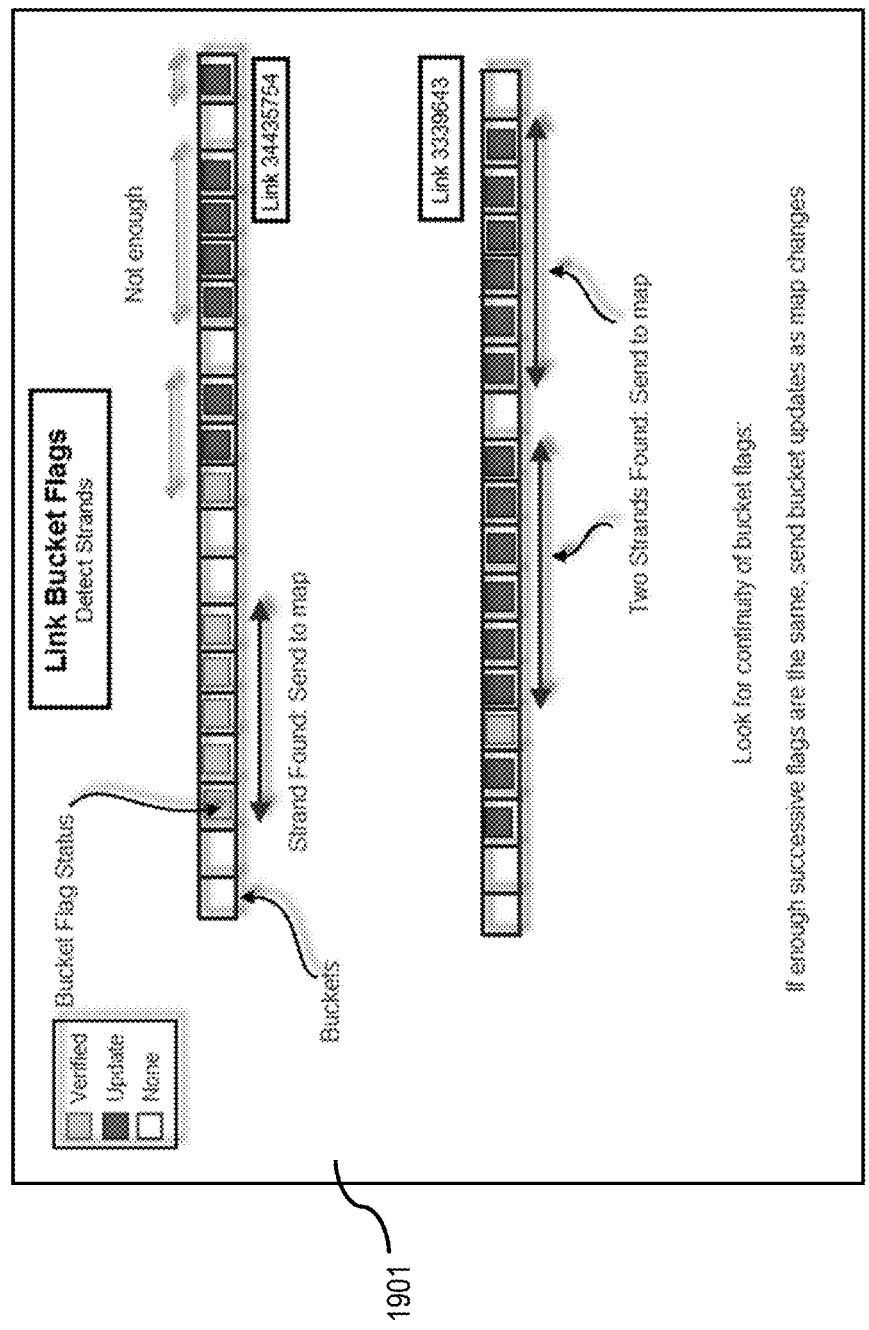
FIG. 19 is a diagram that represents strand detection, according to one example embodiment.

FIG. 19 is a diagram that represents strand detection, according to one example embodiment. In one scenario, the bucket processing operates on each bucket independently, and has no association with its neighbors 1901. As a result, the strand processing step is responsible for associating the neighboring buckets. This step only requires the bucket status flags, not the contained list of data samples. Therefore, the process only requires a fairly light amount of data processing. In one scenario, along each link, all buckets are compared to their neighbors. If the each successive neighbor contains the same status flag, the strand is grown. If a bucket is undefined, or different than its neighbor the strand is broken. Any strands which reach a threshold length are considered stable enough for map updates. For now, this threshold will be considered as five buckets. In one scenario, the strand process only requires the bucket ID and bucket flag values, not the accumulated sample values. Therefore, the process is fairly lightweight. There are two options for delivery of strands to the final map update process (RepublishMap Message). A message containing a simple list of bucket Id that define the strand might suffice, in this case, the map republish would be responsible for looking up the actual replacement values from the bucket database. A second option would build a self-contained update message that includes all information required for the map update. For example, RepublishMap=List [Link ID, Parameter, Value, Type, Flag] wherein Type=slope or curvature, and Flag=verify/update.

Figure 20:
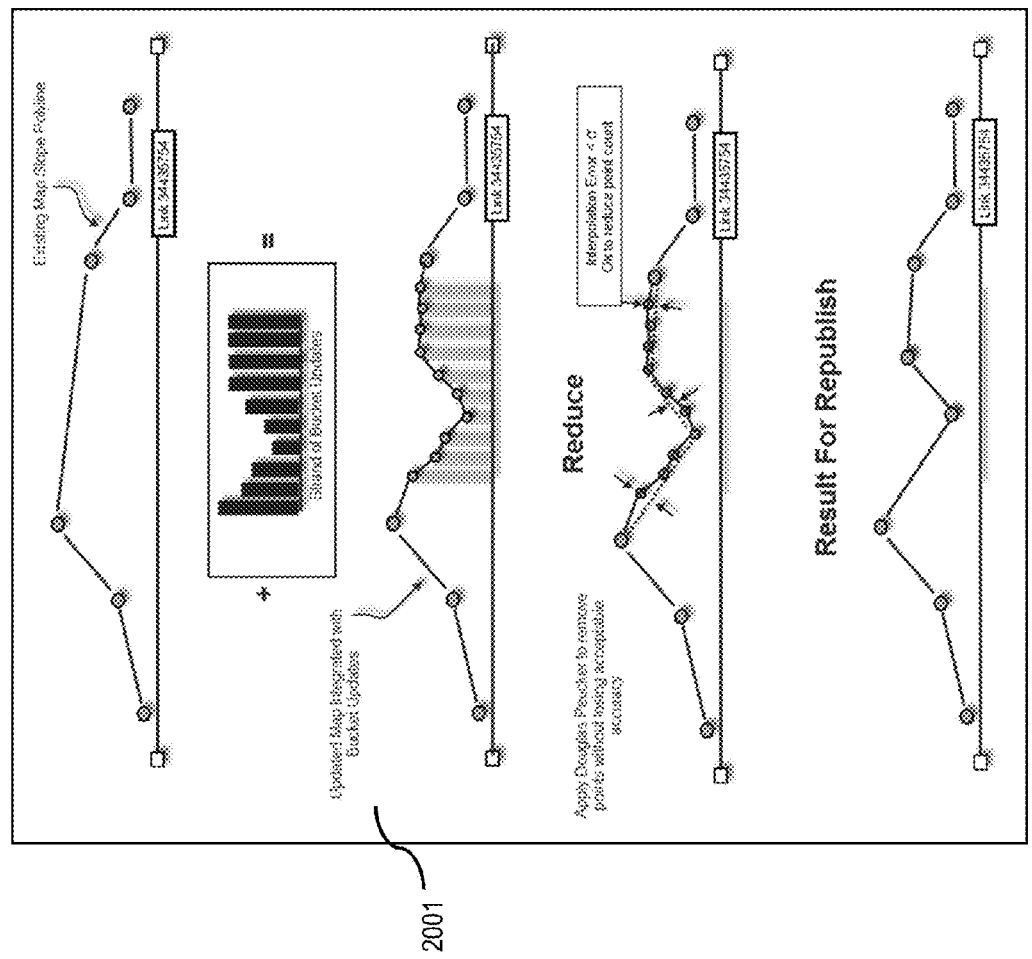
FIG. 20 is a diagram that represents updated map from bucket updates, according to one example embodiment.

FIG. 20 is a diagram that represents updated map from bucket updates, according to one example embodiment. In one scenario, the map republish process accepts a set of new slope/curvature values for a specific position along a specific link ID [2001]. This process is responsible for determining how to modify the existing map database. At present, the slope and curvature values are defined as attributes along the link ID spline and are defined by parameter offsets along the spline. The continuous slope/curvature along the spline is available by simply linear interpolation polyline. This parameterized storage enabled direct replacement and updating of the values as shown in FIG. 20. In one scenario, any existing attribute points that fall within the replacement bucket range are removed. Then, the full set bucket updates (a value at every 10 m) are inserted into the link's attribute list. Finally, a Douglas Peucker process is applied to the full detail attribute polyline in order to reduce the number of output points. The Douglas Peucker successively removes points while certifying that the remaining polyline never varies from the full detail dataset by more than some specified tolerance.

Figure 21:
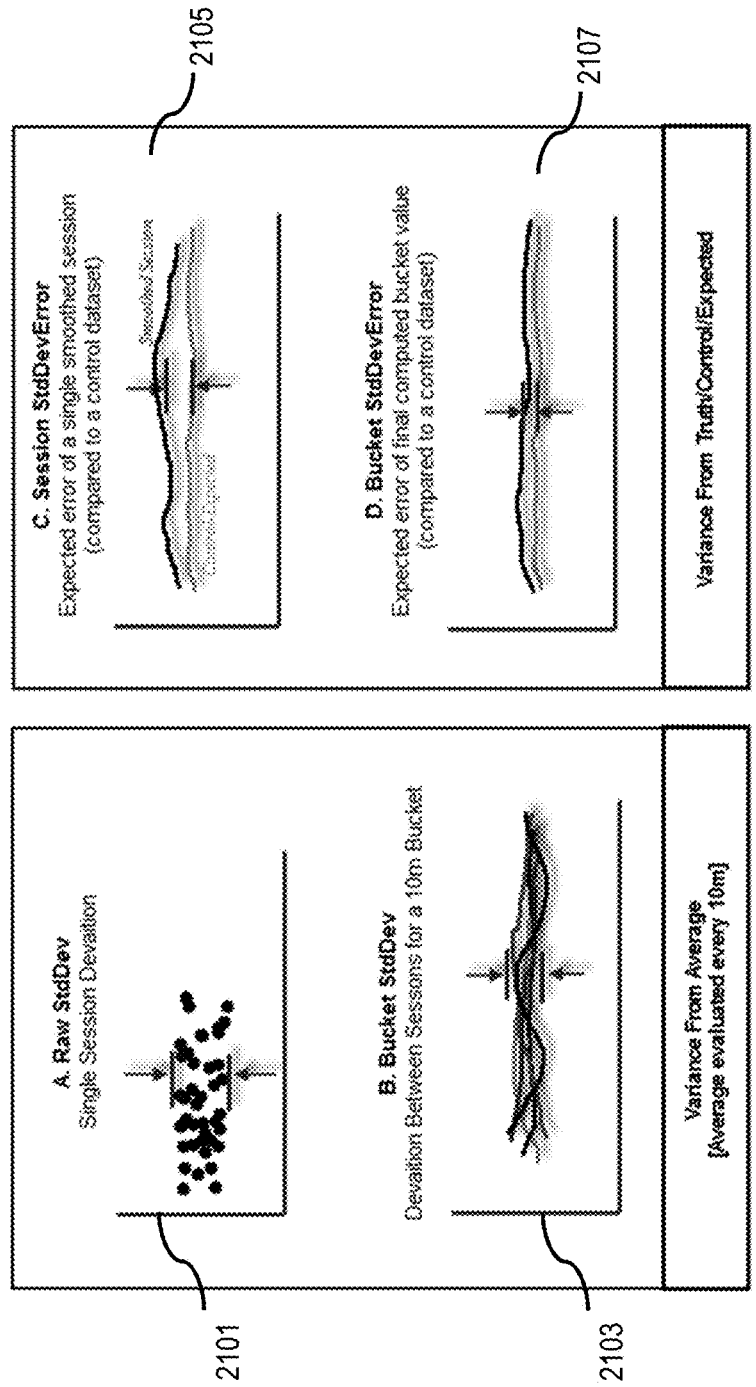
FIG. 21 is a graph diagram that represents various types of expected standard deviations, according to one example embodiment.

FIG. 21 is a graph diagram that represents various types of expected standard deviations, according to one example embodiment. In one scenario, 2101 represents a raw standard deviation for a single session deviation. In another scenario, 2103 represents a bucket standard deviation for a deviation between sessions for a 10 meter bucket. In a further scenario, 2105 represents a session standard deviation error, an expected error of a single smoothed session as compared to a controlled dataset. In a further scenario, 2107 represents a bucket standard deviation error, an expected error of final computed bucket value as compared to a control dataset. In one example embodiment, the slope standard deviation (i.e., the expected error at 68.2% confidence). In one scenario, the variables are representative of the type of expected values:

A. Expected StdDev: Single unfiltered session; compare in 10 m buckets

| SlopeSessionStdDev | $X_1$ Degrees |
|---|---|

B. Expected StdDev: difference between multiple sessions; compare in 10 m buckets

| SlopeMultiSessionStdDev | $X_2$ Degrees |
|---|---|

C. Expected StdError for Single Session, compared to truth/control

| SlopeSessionStdDevError | $X_3$ Degrees |
|---|---|

D. Expected StdError for the merged result of all sessions, compared to truth/control

| SlopeFinalStdDevError | $X_4$ Degrees |
|---|---|

In one scenario, for the curvature standard deviations, the curvature results are transformed to N values using the Log 10 value method from the curvature logarithmic transform and the radius/curvature transform method. Thus, a StdDev of 1.0 means that users are within 1 bucket at 68% confidence, where a bucket is defined in Error! Reference source not found. or by $N = 24 - 6 \log_{10}$ (Radius).

A. Expected StdDev: Single unfiltered session; compare in 10 m buckets

| NCurvSessionStdDev | $X_5$ Buckets |
|---|---|

B. Expected StdDev: difference between multiple sessions; compare in 10 m buckets

| NCurvMultiSessionStdDev | $X_6$ Buckets |
|---|---|

C. Expected StdError for Single Session, compared to truth/control

| NCurvSessionStdDevError | $X_7$ Buckets |
|---|---|

E. Expected StdError for the merged result of all sessions, compared to truth/control

| NCurvFinalStdDevError | $X_8$ Buckets |
|---|---|

Figure 22B:
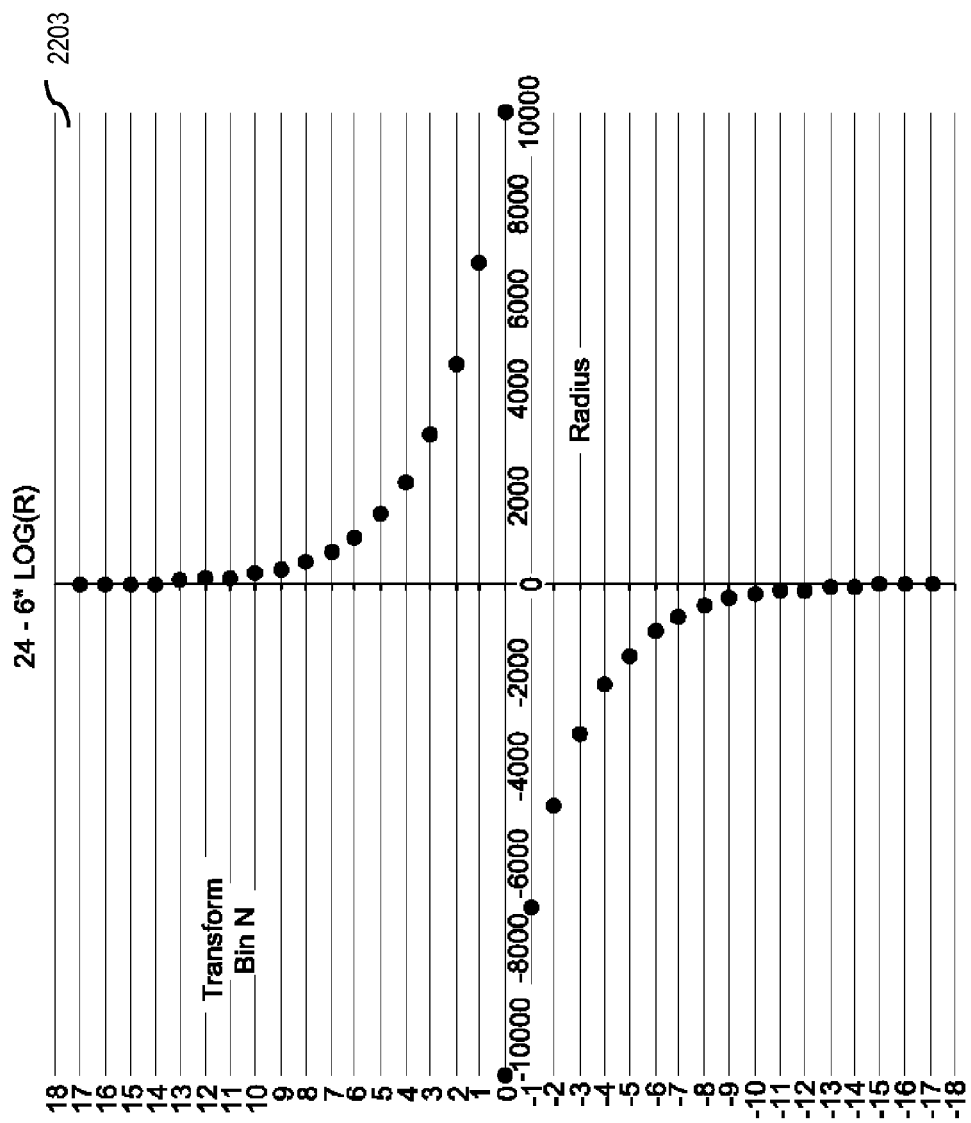
Figure 22C:
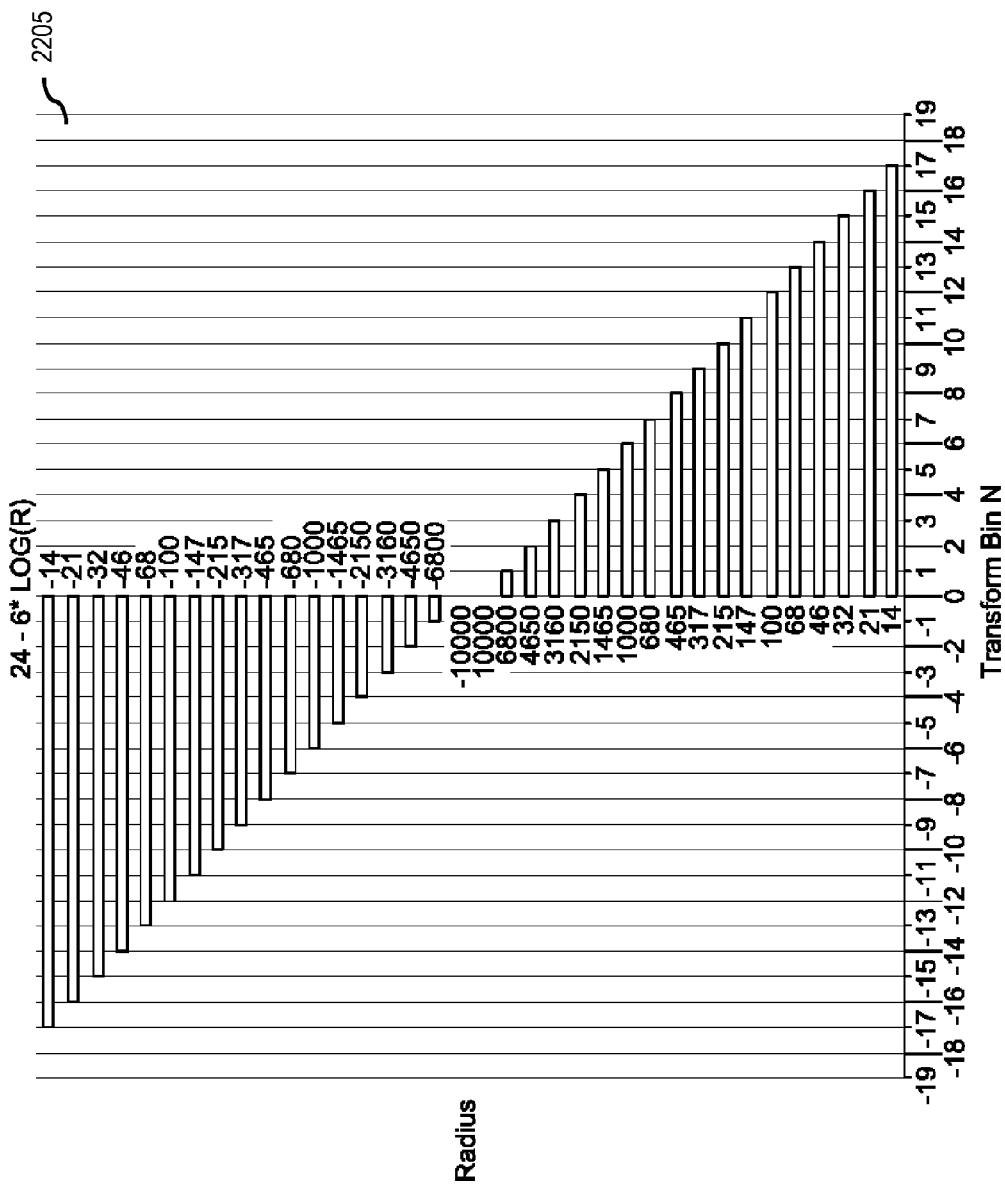

FIGS. 22 A-C are graph diagrams that represent the radius/curvature transform method, according to one example embodiment. In one scenario, the curvature transform is defined as N=24-6 Log 10 (Radius) and is represented in 2201. The most intuitive method for defining curvature accuracy is to place values in bins with ranges that are meaningful so that huge radii values do not skew the statistics. This is represented in 2203 and 2205. Although the equation (N=24-6 Log 10 (Radius)) is continuous, it might be useful to consider the N value as creating 36 bins of curvature, each with an increasing range of radii values as the radius increases. Therefore, an error values of X would mean users are within X bins of the actual value. In addition, radius is applied as an absolute value, but the original sign is carried through to maintain the direction of curvature: N=[24-6 Log 10 (Abs (Radius))]*Sign (Radius).

Figure 23:
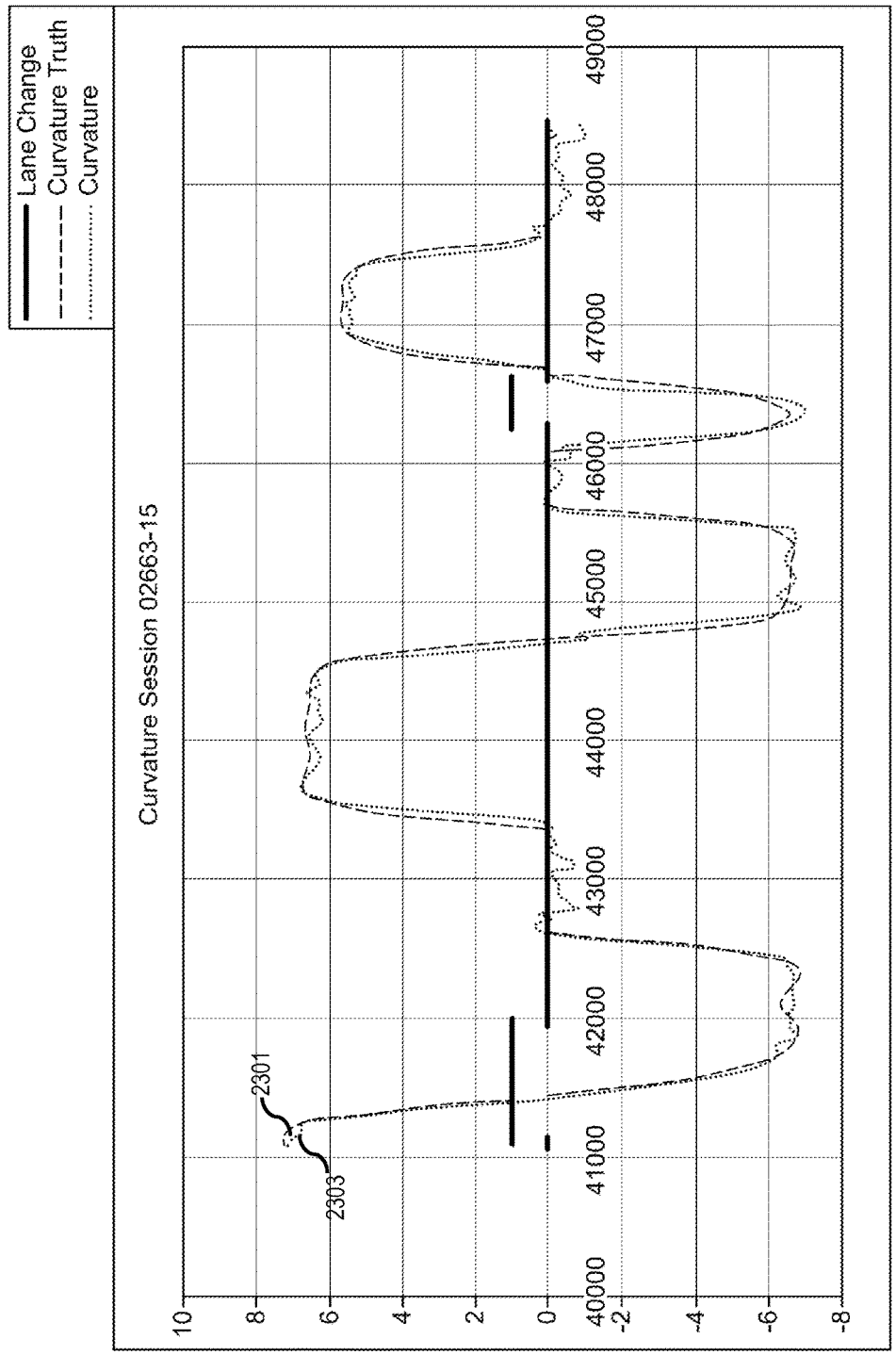
FIG. 23 is a graph diagram that represents data from a single reliable session, according to one example embodiment.

FIG. 23 is a graph diagram that represents data from a single reliable session, according to one example embodiment. In one scenario, line 2301 is the computed values from a single drive session. In another scenario, line 2303 is the ADAS control.

Figure 24:
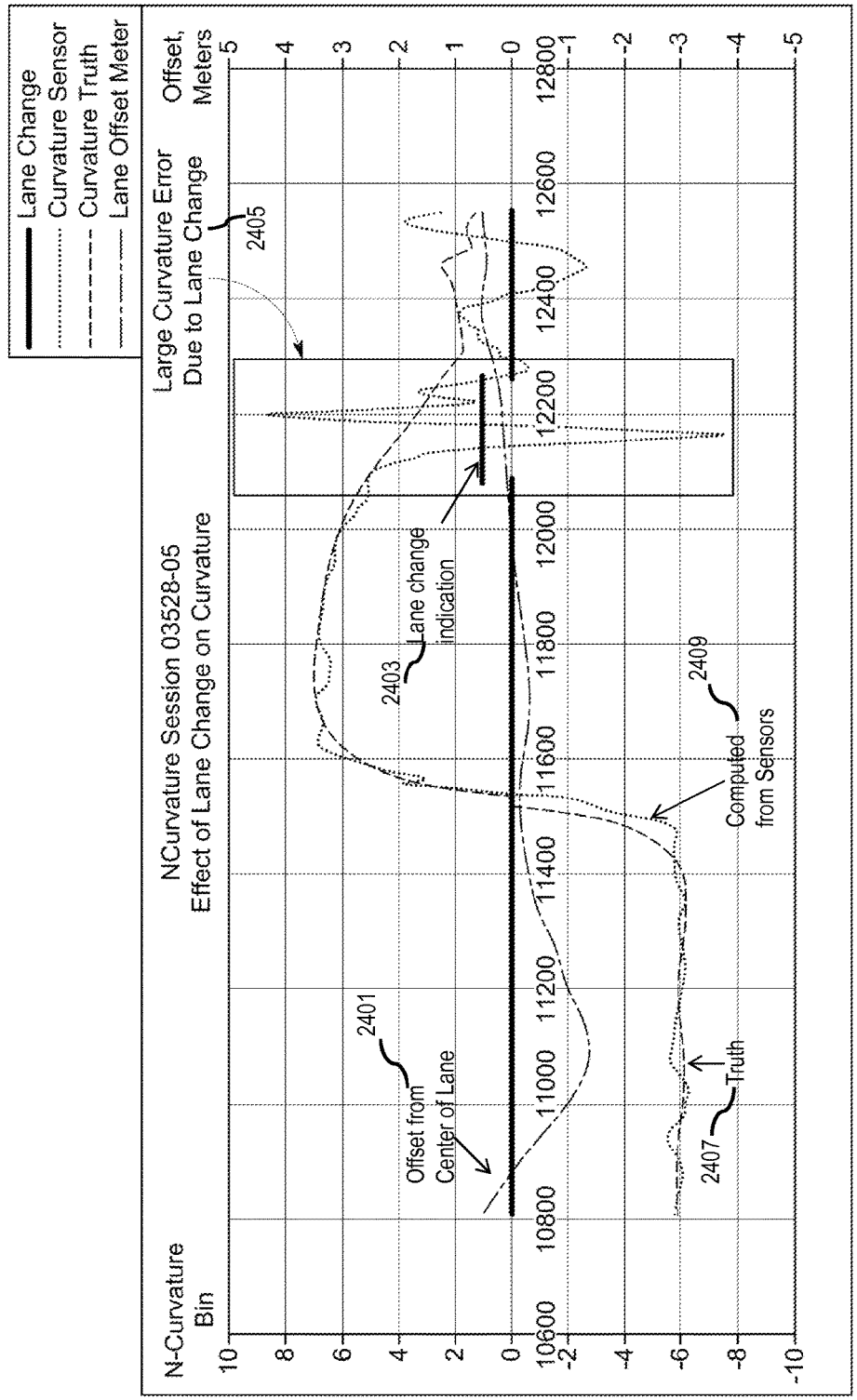
FIG. 24 is a graph diagram that represents the effect of lane change on a curvature, according to one example embodiment.

FIG. 24 is a graph diagram that represents the effect of lane change on a curvature, according to one example embodiment. In one scenario, 2401 represents an offset from center of the lane. In another scenario, 2403 represents lane change indication. In a further scenario, 2405 represents a large curvature error due to a lane change. In another scenario, line 2407 represents the truth for one or more curvature. In another scenario, line 2409 represents computed curvature from one or more sensors.

Figure 25:
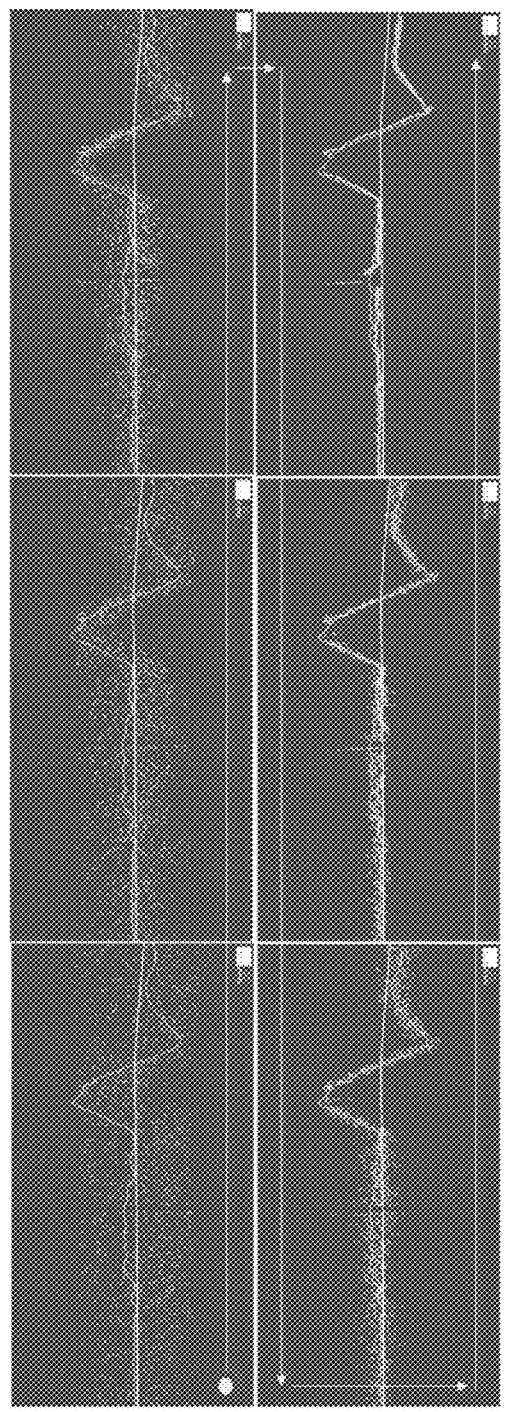
FIG. 25 is a graph diagram that represents an increasing moving average window size, according to one example embodiment.

FIG. 25 is a graph diagram that represents an increasing moving average window size, according to one example embodiment.

Figure 26:
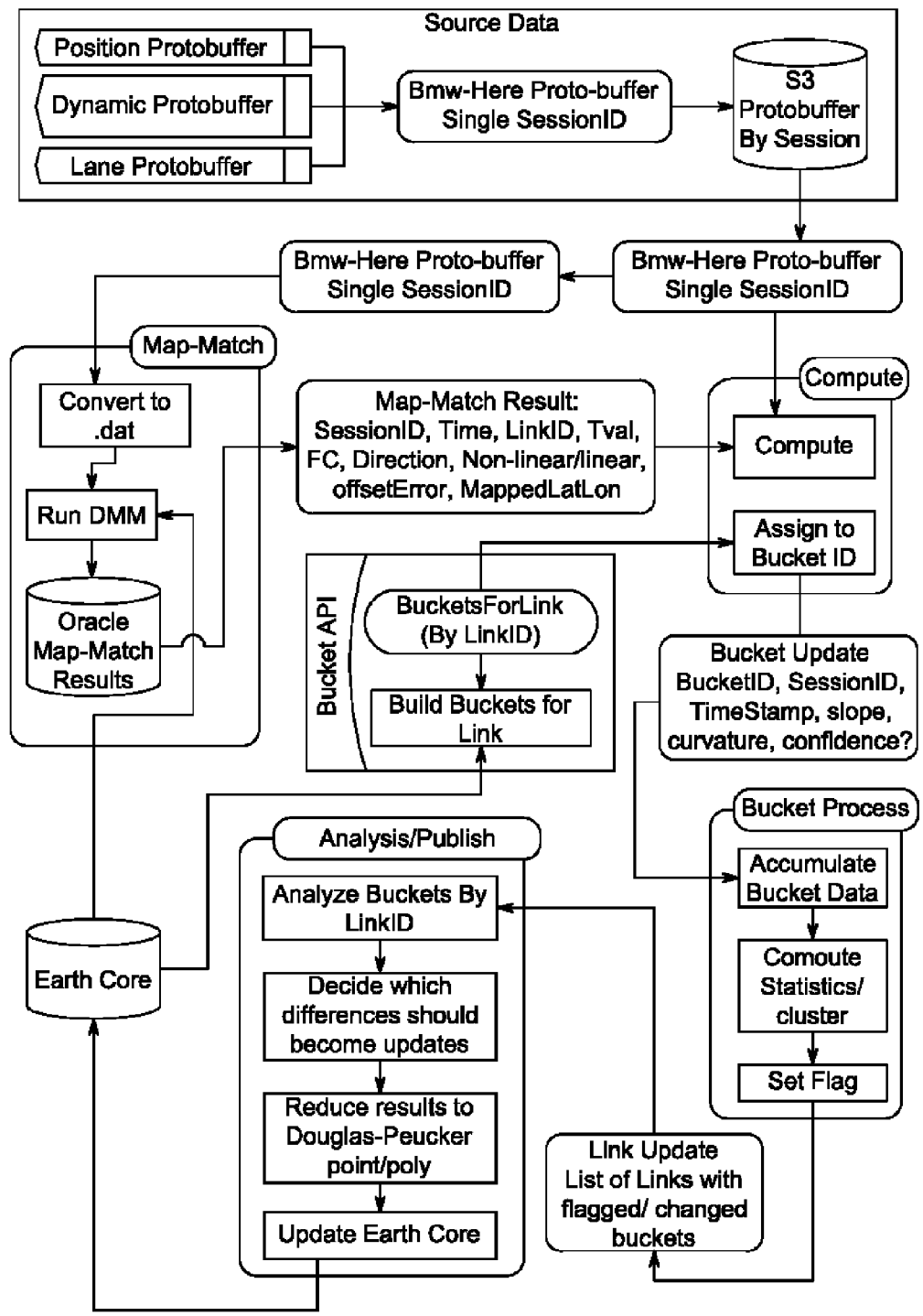
FIG. 26 is a flow diagram that represents a scenario wherein a single proto-buffer file is processed to determine information required for slope-curvature computation for a single Session ID, according to one example embodiment.

FIG. 26 is a flow diagram that represents a scenario wherein a single proto-buffer file is processed to determine information required for slope-curvature computation for a single Session ID, according to one example embodiment.

The processes described herein for converting voluminous sensor datasets into manageable distance based buckets for slope and curvature map updates may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 27:
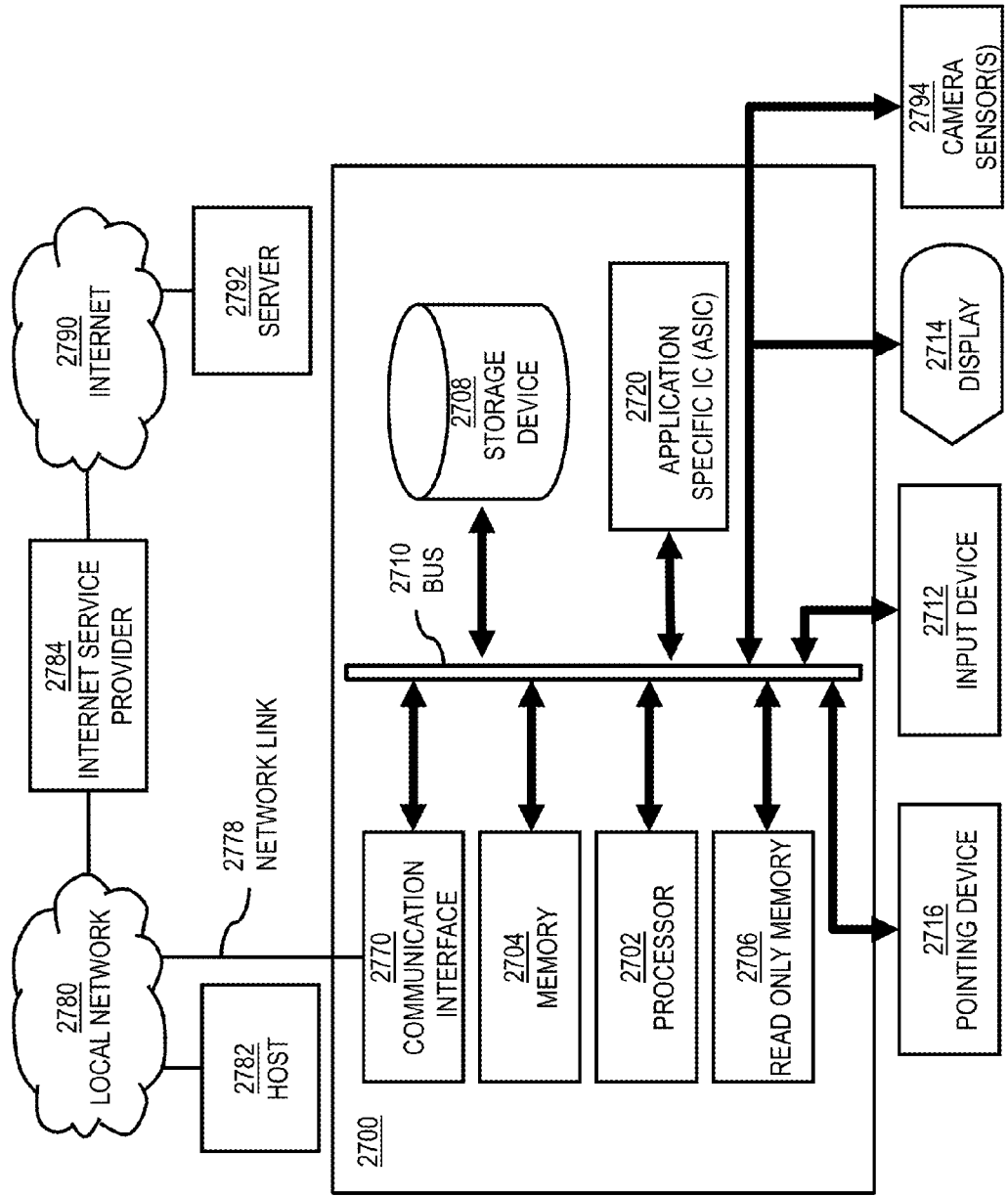
FIG. 27 is a diagram of hardware that can be used to implement an embodiment of the invention.

FIG. 27 illustrates a computer system 2700 upon which an embodiment of the invention may be implemented. Although computer system 2700 is depicted with respect to a particular device or equipment, it is contemplated that other devices or equipment (e.g., network elements, servers, etc.) within FIG. 27 can deploy the illustrated hardware and components of system 2700. Computer system 2700 is programmed (e.g., via computer program code or instructions) to convert voluminous sensor datasets into manageable distance based buckets for slope and curvature map updates as described herein and includes a communication mechanism such as a bus 2710 for passing information between other internal and external components of the computer system 2700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 2700, or a portion thereof, constitutes a means for performing one or more steps of converting voluminous sensor datasets into manageable distance based buckets for slope and curvature map updates.

A bus 2710 includes one or more parallel conductors of information so that information is transferred quickly among devices coupled to the bus 2710. One or more processors 2702 for processing information are coupled with the bus 2710.

A processor (or multiple processors) 2702 performs a set of operations on information as specified by computer program code related to convert voluminous sensor datasets into manageable distance based buckets for slope and curvature map updates. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 2710 and placing information on the bus 2710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 2702, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 2700 also includes a memory 2704 coupled to bus 2710. The memory 2704, such as a random access memory (RAM) or any other dynamic storage device, stores information including processor instructions for converting voluminous sensor datasets into manageable distance based buckets for slope and curvature map updates. Dynamic memory allows information stored therein to be changed by the computer system 2700. RAM allows a unit of information stored at a location called a memory address to be stored and retrieved independently of information at neighboring addresses. The memory 2704 is also used by the processor 2702 to store temporary values during execution of processor instructions. The computer system 2700 also includes a read only memory (ROM) 2706 or any other static storage device coupled to the bus 2710 for storing static information, including instructions, that is not changed by the computer system 2700. Some memory is composed of volatile storage that loses the information stored thereon when power is lost. Also coupled to bus 2710 is a non-volatile (persistent) storage device 2708, such as a magnetic disk, optical disk or flash card, for storing information, including instructions, that persists even when the computer system 2700 is turned off or otherwise loses power.

Information, including instructions for converting voluminous sensor datasets into manageable distance based buckets for slope and curvature map updates, is provided to the bus 2710 for use by the processor from an external input device 2712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 2700. Other external devices coupled to bus 2710, used primarily for interacting with humans, include a display device 2714, such as a cathode ray tube (CRT), a liquid crystal display (LCD), a light emitting diode (LED) display, an organic LED (OLED) display, a plasma screen, or a printer for presenting text or images, and a pointing device 2716, such as a mouse, a trackball, cursor direction keys, or a motion sensor, for controlling a position of a small cursor image presented on the display 2714 and issuing commands associated with graphical elements presented on the display 2714, and one or more camera sensors 2794 for capturing, recording and causing to store one or more still and/or moving images (e.g., videos, movies, etc.) which also may comprise audio recordings. In some embodiments, for example, in embodiments in which the computer system 2700 performs all functions automatically without human input, one or more of external input device 2712, display device 2714 and pointing device 2716 may be omitted.

In the illustrated embodiment, special purpose hardware, such as an application specific integrated circuit (ASIC) 2720, is coupled to bus 2710. The special purpose hardware is configured to perform operations not performed by processor 2702 quickly enough for special purposes. Examples of ASICs include graphics accelerator cards for generating images for display 2714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 2700 also includes one or more instances of a communications interface 2770 coupled to bus 2710. Communication interface 2770 provides a one-way or two-way communication coupling to a variety of external devices that operate with their own processors, such as printers, scanners and external disks. In general the coupling is with a network link 2778 that is connected to a local network 2780 to which a variety of external devices with their own processors are connected. For example, communication interface 2770 may be a parallel port or a serial port or a universal serial bus (USB) port on a personal computer. In some embodiments, communications interface 2770 is an integrated services digital network (ISDN) card or a digital subscriber line (DSL) card or a telephone modem that provides an information communication connection to a corresponding type of telephone line. In some embodiments, a communication interface 2770 is a cable modem that converts signals on bus 2710 into signals for a communication connection over a coaxial cable or into optical signals for a communication connection over a fiber optic cable. As another example, communications interface 2770 may be a local area network (LAN) card to provide a data communication connection to a compatible LAN, such as Ethernet. Wireless links may also be implemented. For wireless links, the communications interface 2770 sends or receives or both sends and receives electrical, acoustic or electromagnetic signals, including infrared and optical signals, that carry information streams, such as digital data. For example, in wireless handheld devices, such as mobile telephones like cell phones, the communications interface 2770 includes a radio band electromagnetic transmitter and receiver called a radio transceiver. In certain embodiments, the communications interface 2770 enables connection to the communication network 107 for converting voluminous sensor datasets into manageable distance based buckets for slope and curvature map updates to the UE 101.

The term "computer-readable medium" as used herein refers to any medium that participates in providing information to processor 2702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 2708. Volatile media include, for example, dynamic memory 2704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 2720.

Network link 2778 typically provides information communication using transmission media through one or more networks to other devices that use or process the information. For example, network link 2778 may provide a connection through local network 2780 to a host computer 2782 or to equipment 2784 operated by an Internet Service Provider (ISP). ISP equipment 2784 in turn provides data communication services through the public, world-wide packet-switching communication network of networks now commonly referred to as the Internet 2790.

A computer called a server host 2792 connected to the Internet hosts a process that provides a service in response to information received over the Internet. For example, server host 2792 hosts a process that provides information representing video data for presentation at display 2714. It is contemplated that the components of system 2700 can be deployed in various configurations within other computer systems, e.g., host 2782 and server 2792.

At least some embodiments of the invention are related to the use of computer system 2700 for implementing some or all of the techniques described herein. According to one embodiment of the invention, those techniques are performed by computer system 2700 in response to processor 2702 executing one or more sequences of one or more processor instructions contained in memory 2704. Such instructions, also called computer instructions, software and program code, may be read into memory 2704 from another computer-readable medium such as storage device 2708 or network link 2778. Execution of the sequences of instructions contained in memory 2704 causes processor 2702 to perform one or more of the method steps described herein. In alternative embodiments, hardware, such as ASIC 2720, may be used in place of or in combination with software to implement the invention. Thus, embodiments of the invention are not limited to any specific combination of hardware and software, unless otherwise explicitly stated herein.

The signals transmitted over network link 2778 and other networks through communications interface 2770, carry information to and from computer system 2700. Computer system 2700 can send and receive information, including program code, through the networks 2780, 2790 among others, through network link 2778 and communications interface 2770. In an example using the Internet 2790, a server host 2792 transmits program code for a particular application, requested by a message sent from computer 2700, through Internet 2790, ISP equipment 2784, local network 2780 and communications interface 2770. The received code may be executed by processor 2702 as it is received, or may be stored in memory 2704 or in storage device 2708 or any other non-volatile storage for later execution, or both. In this manner, computer system 2700 may obtain application program code in the form of signals on a carrier wave.

Various forms of computer readable media may be involved in carrying one or more sequence of instructions or data or both to processor 2702 for execution. For example, instructions and data may initially be carried on a magnetic disk of a remote computer such as host 2782. The remote computer loads the instructions and data into its dynamic memory and sends the instructions and data over a telephone line using a modem. A modem local to the computer system 2700 receives the instructions and data on a telephone line and uses an infra-red transmitter to convert the instructions and data to a signal on an infra-red carrier wave serving as the network link 2778. An infrared detector serving as communications interface 2770 receives the instructions and data carried in the infrared signal and places information representing the instructions and data onto bus 2710. Bus 2710 carries the information to memory 2704 from which processor 2702 retrieves and executes the instructions using some of the data sent with the instructions. The instructions and data received in memory 2704 may optionally be stored on storage device 2708, either before or after execution by the processor 2702.

Figure 28:
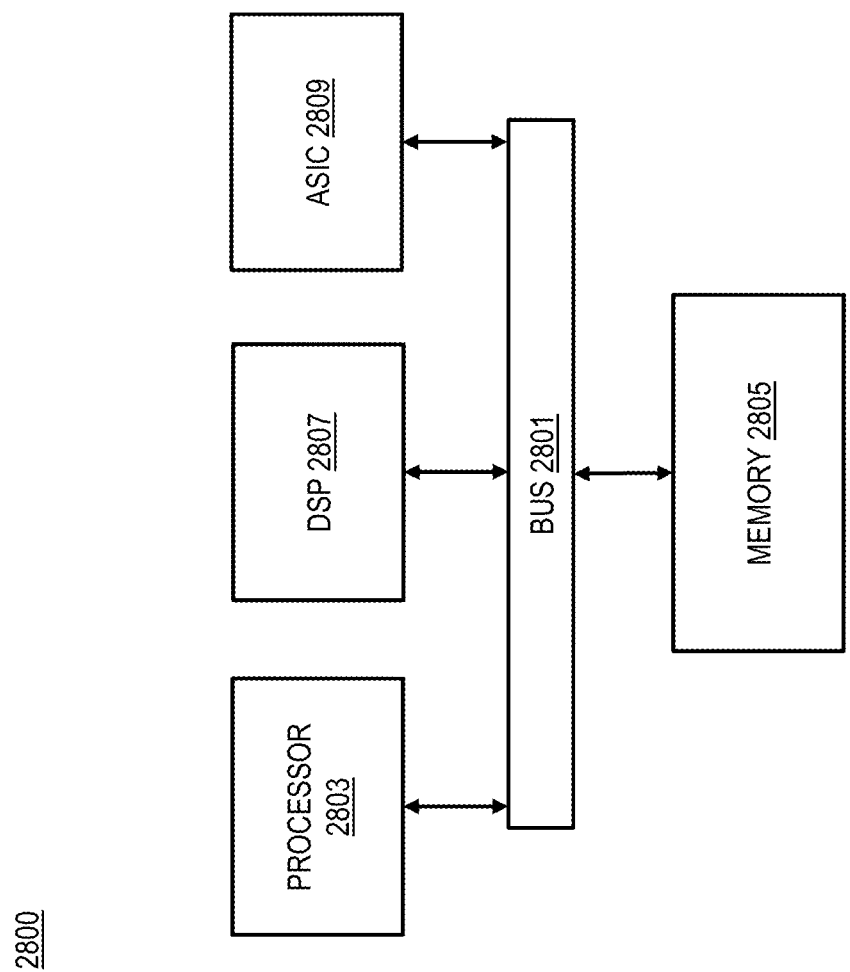
FIG. 28 is a diagram of a chip set that can be used to implement an embodiment of the invention.

FIG. 28 illustrates a chip set or chip 2800 upon which an embodiment of the invention may be implemented. Chip set 2800 is programmed to convert voluminous sensor datasets into manageable distance based buckets for slope and curvature map updates as described herein and includes, for instance, the processor and memory components described with respect to FIG. 27 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 2800 can be implemented in a single chip. It is further contemplated that in certain embodiments the chip set or chip 2800 can be implemented as a single "system on a chip." It is further contemplated that in certain embodiments a separate ASIC would not be used, for example, and that all relevant functions as disclosed herein would be performed by a processor or processors. Chip set or chip 2800, or a portion thereof, constitutes a means for performing one or more steps of providing user interface navigation information associated with the availability of functions. Chip set or chip 2800, or a portion thereof, constitutes a means for performing one or more steps of converting voluminous sensor datasets into manageable distance based buckets for slope and curvature map updates.

In one embodiment, the chip set or chip 2800 includes a communication mechanism such as a bus 2801 for passing information among the components of the chip set 2800. A processor 2803 has connectivity to the bus 2801 to execute instructions and process information stored in, for example, a memory 2805. The processor 2803 may include one or more processing cores with each core configured to perform independently. A multi-core processor enables multiprocessing within a single physical package. Examples of a multi-core processor include two, four, eight, or greater numbers of processing cores. Alternatively or in addition, the processor 2803 may include one or more microprocessors configured in tandem via the bus 2801 to enable independent execution of instructions, pipelining, and multithreading. The processor 2803 may also be accompanied with one or more specialized components to perform certain processing functions and tasks such as one or more digital signal processors (DSP) 2807, or one or more application-specific integrated circuits (ASIC) 2809. A DSP 2807 typically is configured to process real-world signals (e.g., sound) in real time independently of the processor 2803. Similarly, an ASIC 2809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 2800 includes merely one or more processors and some software and/or firmware supporting and/or relating to and/or for the one or more processors.

The processor 2803 and accompanying components have connectivity to the memory 2805 via the bus 2801. The memory 2805 includes both dynamic memory (e.g., RAM, magnetic disk, writable optical disk, etc.) and static memory (e.g., ROM, CD-ROM, etc.) for storing executable instructions that when executed perform the inventive steps described herein to convert voluminous sensor datasets into manageable distance based buckets for slope and curvature map updates. The memory 2805 also stores the data associated with or generated by the execution of the inventive steps.

Figure 29:
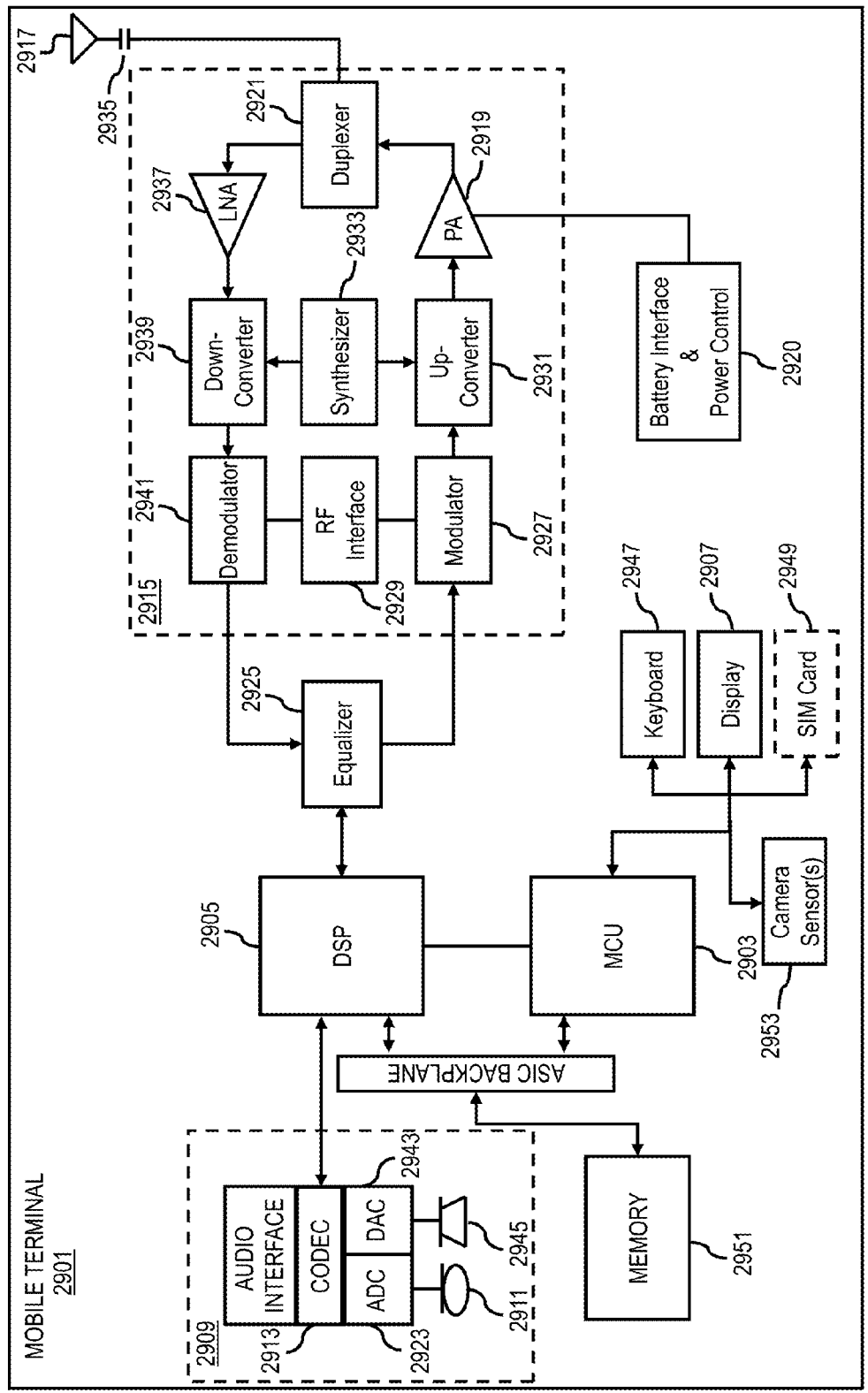
FIG. 29 is a diagram of a mobile terminal (e.g., handset) that can be used to implement an embodiment of the invention.

FIG. 29 is a diagram of exemplary components of a mobile terminal (e.g., handset) for communications, which is capable of operating in the system of FIG. 1A, according to one embodiment. In some embodiments, mobile terminal 2901, or a portion thereof, constitutes a means for performing one or more steps of converting voluminous sensor datasets into manageable distance based buckets for slope and curvature map updates. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 2903, a Digital Signal Processor (DSP) 2905, and a receiver/transmitter unit including a microphone gain control unit and a speaker gain control unit. A main display unit 2907 provides a display to the user in support of various applications and mobile terminal functions that perform or support the steps of converting voluminous sensor datasets into manageable distance based buckets for slope and curvature map updates. The display 2907 includes display circuitry configured to display at least a portion of a user interface of the mobile terminal (e.g., mobile telephone). Additionally, the display 2907 and display circuitry are configured to facilitate user control of at least some functions of the mobile terminal. An audio function circuitry 2909 includes a microphone 2911 and microphone amplifier that amplifies the speech signal output from the microphone 2911. The amplified speech signal output from the microphone 2911 is fed to a coder/decoder (CODEC) 2913.

A radio section 2915 amplifies power and converts frequency in order to communicate with a base station, which is included in a mobile communication system, via antenna 2917. The power amplifier (PA) 2919 and the transmitter/modulation circuitry are operationally responsive to the MCU 2903, with an output from the PA 2919 coupled to the duplexer 2921 or circulator or antenna switch, as known in the art. The PA 2919 also couples to a battery interface and power control unit 2920.

In use, a user of mobile terminal 2901 speaks into the microphone 2911 and his or her voice along with any detected background noise is converted into an analog voltage. The analog voltage is then converted into a digital signal through the Analog to Digital Converter (ADC) 2923. The control unit 2903 routes the digital signal into the DSP 2905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2925 for compensation of any frequency-dependent impairments that occur during transmission though the air such as phase and amplitude distortion. After equalizing the bit stream, the modulator 2927 combines the signal with a RF signal generated in the RF interface 2929. The modulator 2927 generates a sine wave by way of frequency or phase modulation. In order to prepare the signal for transmission, an up-converter 2931 combines the sine wave output from the modulator 2927 with another sine wave generated by a synthesizer 2933 to achieve the desired frequency of transmission. The signal is then sent through a PA 2919 to increase the signal to an appropriate power level. In practical systems, the PA 2919 acts as a variable gain amplifier whose gain is controlled by the DSP 2905 from information received from a network base station. The signal is then filtered within the duplexer 2921 and optionally sent to an antenna coupler 2935 to match impedances to provide maximum power transfer. Finally, the signal is transmitted via antenna 2917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 2901 are received via antenna 2917 and immediately amplified by a low noise amplifier (LNA) 2937. A down-converter 2939 lowers the carrier frequency while the demodulator 2941 strips away the RF leaving only a digital bit stream. The signal then goes through the equalizer 2925 and is processed by the DSP 2905. A Digital to Analog Converter (DAC) 2943 converts the signal and the resulting output is transmitted to the user through the speaker 2945, all under control of a Main Control Unit (MCU) 2903 which can be implemented as a Central Processing Unit (CPU).

The MCU 2903 receives various signals including input signals from the keyboard 2947. The keyboard 2947 and/or the MCU 2903 in combination with other user input components (e.g., the microphone 2911) comprise a user interface circuitry for managing user input. The MCU 2903 runs a user interface software to facilitate user control of at least some functions of the mobile terminal 2901 to convert voluminous sensor datasets into manageable distance based buckets for slope and curvature map updates. The MCU 2903 also delivers a display command and a switch command to the display 2907 and to the speech output switching controller, respectively. Further, the MCU 2903 exchanges information with the DSP 2905 and can access an optionally incorporated SIM card 2949 and a memory 2951. In addition, the MCU 2903 executes various control functions required of the terminal. The DSP 2905 may, depending upon the implementation, perform any of a variety of conventional digital processing functions on the voice signals. Additionally, DSP 2905 determines the background noise level of the local environment from the signals detected by microphone 2911 and sets the gain of microphone 2911 to a level selected to compensate for the natural tendency of the user of the mobile terminal 2901.

The CODEC 2913 includes the ADC 2923 and DAC 2943. The memory 2951 stores various data including call incoming tone data and is capable of storing other data including music data received via, e.g., the global Internet. The software module could reside in RAM memory, flash memory, registers, or any other form of writable storage medium known in the art. The memory device 2951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2949 carries, for instance, important information, such as the cellular phone number, the carrier supplying service, subscription details, and security information. The SIM card 2949 serves primarily to identify the mobile terminal 2901 on a radio network. The card 2949 also contains a memory for storing a personal telephone number registry, text messages, and user specific mobile terminal settings.

Further, one or more camera sensors 2953 may be incorporated onto the mobile station 2901 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    map-matching one or more drive data sessions with map links, wherein the one or more drive data sessions represent one or more location data packages associated with a road currently travelled by a vehicle, wherein the one or more location data packages are crowd sourced and each of the one or more location data packages includes, at least in part, position information, lane information, signage information, or a combination thereof;
    dividing each of the map links at a fixed distance interval into buckets of probe sensor data, wherein the probe sensor data includes slope-curvature values of the map links;
    processing the buckets of probe sensor data for variance statistics to determine reliability information for acceleration slope values, acceleration curvature values, or a combination thereof associated with the map links and calculated from the one or more location data packages, wherein the reliability information specifies whether the slope-curvature values are reliable and consistent for driving the vehicle in an autonomous driving mode; and
    updating, in real-time, one or more maps for driving the vehicle in the autonomous driving mode based, at least in part, on the reliability information.

2. A method of claim 1, further comprising:
    calculating data points that fall within each bucket of probe sensor data into an average value, wherein the reliability information is determined based on the average value, and
    wherein the map-matching includes, at least in part, a point based map-matching, a path based map-matching, a shape based map-matching, or a combination thereof.

3. A method of claim 1, further comprising:
    identifying link based information, parameterized distance along the map links, or a combination thereof during the map-matching.

4. A method of claim 1, further comprising:
    selectively combining the one or more drive data sessions into a proto-buffer file of position information, lane information, signage information, or a combination thereof contiguously collected timewise of the vehicle; and
    processing a position estimate section of the proto-buffer file to determine position information, wherein the position information includes, at least in part, timestamp information, update information, or a combination thereof.

5. A method of claim 1, further comprising:

determining a correct link for the one or more drive data sessions when position estimate values cross from the at least one link to the at least one other link; and inserting a virtual position estimate at the boundary of the at least one link to associate time values map to the at least one link.

6. A method of claim 1, further comprising:

collecting the one or more drive data sessions into one or more columnfold objects contiguously collected timewise of the vehicle, wherein the one or more columnfold objects include position estimate, dynamic longitudinal acceleration, dynamic yaw rate, dynamic velocity, lane change, lane deviation, or a combination thereof.

7. A method of claim 1, further comprising:

creating a new bucket based, at least in part, on monitoring of an update queue for the buckets of probe sensor data; and determining a control value for the map slope curvature based, at least in part, on the creation of the new bucket.

8. A method of claim 1, further comprising:

determining a presence of minimum set of samples within the buckets of probe sensor data;

computing variance statistics to determine one or more outliers samples; and determining that a multi session sample standard deviation is less than expected multi session standard deviation.

9. A method of claim 1, further comprising:

comparing between the buckets of probe sensor data, wherein the comparison includes, at least in part, comparing bucket identification, bucket flag values, or a combination thereof;

growing a strand of successive neighboring buckets containing an identical status flag based, at least in part, on the comparison; and processing the strand for the real-time updating of the one or more maps, when determining that the strand reaches a threshold number of buckets.

10. An apparatus comprising:

at least one processor; and at least one memory including computer program code for one or more programs, the at least one memory and the computer program code configured to, with the at least one processor, cause the apparatus to perform at least the following, map-match one or more drive data sessions with map links, wherein the one or more drive data sessions represent one or more location data packages associated with a road currently travelled by a vehicle, wherein the one or more location data packages are crowd sourced and each of the one or more location data packages includes, at least in part, position information, lane information, signage information, or a combination thereof;

divide each of the map links at a fixed distance interval into buckets of probe sensor data, wherein the probe sensor data includes slope-curvature values of the map links;

process the buckets of probe sensor data for variance statistics to determine reliability information for acceleration slope values, acceleration curvature values, or a combination thereof associated with the map links and calculated from the one or more location data packages, wherein the reliability information specifies whether the slope-curvature values are reliable and consistent for driving the vehicle in an autonomous driving mode; and update, in real-time, one or more maps for driving the vehicle in the autonomous driving mode based, at least in part, on the reliability information.

11. An apparatus of claim 10, wherein the map-matching includes, at least in part, a point based map-matching, a path based map-matching, a shape based map-matching, or a combination thereof.

12. An apparatus of claim 10, wherein the apparatus is further caused to:

identify link based information, parameterized distance along the map links, or a combination thereof during the map-matching.

13. An apparatus of claim 10, wherein the apparatus is further caused to:

selectively combine the one or more drive data sessions into a proto-buffer file of position information, lane information, signage information, or a combination thereof contiguously collected timewise of the vehicle; and process a position estimate section of the proto-buffer file to determine position information, wherein the position information includes, at least in part, timestamp information, update information, or a combination thereof.

14. An apparatus of claim 10, wherein the apparatus is further caused to:

determine a correct link for the one or more drive data sessions when position estimate values cross from the at least one link to the at least one other link; and insert a virtual position estimate at the boundary of the at least one link to associate time values map to the at least one link.

15. An apparatus of claim 10, wherein the apparatus is further caused to:

collect the one or more drive data sessions into one or more columnfold objects contiguously collected timewise of the vehicle, wherein the one or more columnfold objects include position estimate, dynamic longitudinal acceleration, dynamic yaw rate, dynamic velocity, lane change, lane deviation, or a combination thereof.

16. A non-transitory computer-readable storage medium carrying one or more sequences of one or more instructions which, when executed by one or more processors, cause an apparatus to at least perform the following steps:

map-matching one or more drive data sessions with map links, wherein the one or more drive data sessions represent one or more location data packages associated with a road currently travelled by a vehicle, wherein the one or more location data packages are crowd sourced and each of the one or more location data packages includes, at least in part, position information, lane information, signage information, or a combination thereof;

divide each of the map links at a fixed distance interval into buckets of probe sensor data, wherein the probe sensor data includes slope-curvature values of the map links;

processing the buckets of probe sensor data for variance statistics to determine reliability information for acceleration slope values, acceleration curvature values, or a combination thereof associated with the map links and calculated from the one or more location data packages, wherein the reliability information specifies whether the slope-curvature values are reliable and consistent for driving the vehicle in an autonomous driving mode; and updating, in real-time, one or more maps for driving the vehicle in the autonomous driving mode based, at least in part, on the reliability information.

17. A non-transitory computer-readable storage medium of claim 16, wherein the map-matching includes, at least in part, a point based map-matching, a path based map-matching, a shape based map-matching, or a combination thereof.

* * * * *